US011307860B1

(12) United States Patent
Koneru et al.

(10) Patent No.: US 11,307,860 B1
(45) Date of Patent: Apr. 19, 2022

(54) ITERATING GROUP SUM OF MULTIPLE ACCUMULATE OPERATIONS

(71) Applicant: Blaize, Inc., El Dorado Hills, CA (US)

(72) Inventors: Satyaki Koneru, Folsom, CA (US); Kamaraj Thangam, Hyderabad (IN)

(73) Assignee: Blaize, Inc., El Dorado Hills, CA (US)

( * ) Notice: Subject to any disclaimer, the term of this patent is extended or adjusted under 35 U.S.C. 154(b) by 0 days.

(21) Appl. No.: 17/219,926

(22) Filed: Apr. 1, 2021

Related U.S. Application Data

(63) Continuation-in-part of application No. 16/693,092, filed on Nov. 22, 2019, now Pat. No. 10,996,960.

(51) Int. Cl.
*G06F 9/38* (2018.01)
*G06F 9/30* (2018.01)

(52) U.S. Cl.
CPC .......... *G06F 9/3836* (2013.01); *G06F 9/3001* (2013.01); *G06F 9/30065* (2013.01); *G06F 9/3802* (2013.01); *G06F 9/3887* (2013.01)

(58) Field of Classification Search
None
See application file for complete search history.

(56) References Cited

U.S. PATENT DOCUMENTS

| | | | |
|---|---|---|---|
| 7,140,019 B2 | 11/2006 | May et al. | |
| 7,836,284 B2 | 11/2010 | Dockser | |
| 7,856,544 B2 | 12/2010 | Schenfeld et al. | |
| 8,291,006 B2 | 10/2012 | Andrade et al. | |
| 9,367,658 B2 | 6/2016 | Pell et al. | |
| 10,824,938 B2 | 11/2020 | Barik et al. | |
| 2006/0282826 A1 | 12/2006 | Docker | |
| 2010/0274990 A1 | 10/2010 | Wilder et al. | |
| 2011/0088041 A1 | 4/2011 | Alameldeen et al. | |
| 2011/0289507 A1 | 11/2011 | Khan et al. | |
| 2013/0036409 A1 | 2/2013 | Auerbach et al. | |
| 2014/0130023 A1 | 5/2014 | Chen et al. | |
| 2014/0176588 A1 | 6/2014 | Dulak, Jr. et al. | |
| 2018/0307980 A1 | 10/2018 | Barik et al. | |
| 2020/0409705 A1 | 12/2020 | Ould-Ahmed-Vall et al. | |

OTHER PUBLICATIONS

'C-SAW: A Framework for Graph Sampling and Random Walk on GPUs' by Santosh Pandey et al., copyright 2020, IEEE. (Year: 2020).*
'Accelerated floating random walk algorithm for the electrostatic computation with 3-D rectilinear-shaped conductors' by Wenjian Yu et al., copyright 2013, Elsevier. (Year: 2013).*

* cited by examiner

*Primary Examiner* — Steven G Snyder
(74) *Attorney, Agent, or Firm* — Brian R. Short

(57) ABSTRACT

Methods, systems and apparatuses for performing walk operations of single instruction, multiple data (SIMD) instructions are disclosed. One method includes initiating, by a scheduler, a SIMD thread, where the scheduler is operative to schedule the SIMD thread. The method further includes fetching a plurality of instructions for the SIMD thread. The method further includes determining, by a thread arbiter, at least one instruction that is a walk instruction, where the walk instruction iterates a block of instructions for a subset of channels of the SIMD thread, where the walk instruction includes a walk size, and where the walk size is a number of channels in the subset of channels of the SIMD thread that are processed in a walk iteration in association with the walk instruction. The method further includes executing the walk instruction based on the walk size.

20 Claims, 20 Drawing Sheets

Thread size: 16x16

LOAD IB[0] mR0 [16x16,pitch2,index.mode3];

LOAD IB[1] mR4 [16x16,pitch 2,index.mode3];

402 — WALK walksize.8x8;

406 — MOV mR10 wmR0;

MOV mR11 wmR4;

If (mR10 == mR11)

412 — WALK walksize.4x4;

416 —
MOV mR12 wmR10;
MOV mR13 wmR11;
ADD mR14 mR12 mR13 [4x4];
MOV wMR15 mR14;

414 — ENDWALK walksize.8x8;

endIF

MOV wMR16 mR15;

404 — ENDWALK walksize.disp;

STORE mR16

STORE mR17

STORE mR18

STORE mR19.

802 — WALK walksize.8x8;

806 —
MOVI mR2 0;      // [8x8]

LOAD IB[0] mR0;   // [8x8]

LOAD IB[1] mR1;   // [8x8]

812 — If (mR0 != mR1)

816 — WALK walksize.4x4;

814 — ADD wmR2 wmR0 wmR1;  //

[4x4]

ENDWALK walksize.8x8;

804 — endIF

ENDWALK walksize.disp;

STORE mR2;   // 8x8

16 x 16 x 4 Input
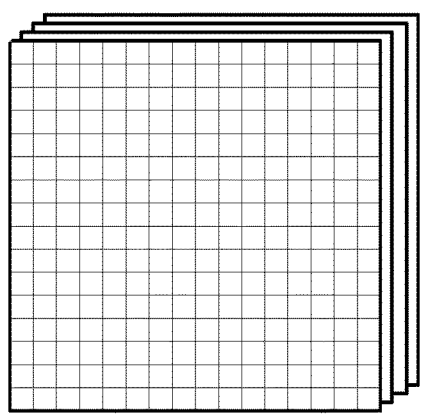
1 x 1 x 4 Weight
\*  =
Convolution
16 x 16 Output
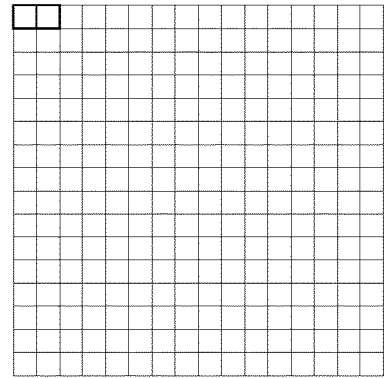
FIGURE 12A
16 x 16 x 4 Input
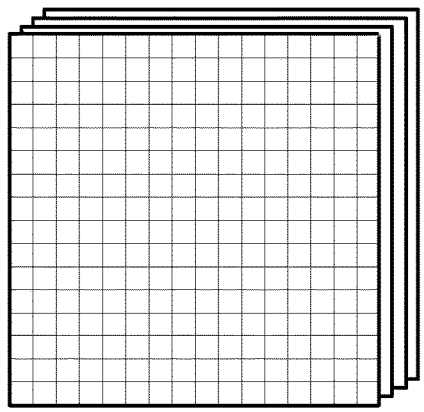
16 x 16 Error
\* 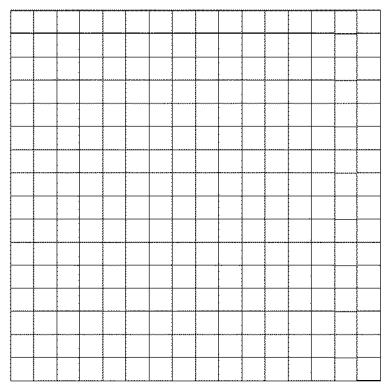 =
Group Convolution
1 x 1 x 4 Weight Error
FIGURE 12B

DPAC-4 (SOMAC with 4 terms) operation for instruction size=8

(instruction size sets the number of iterations)

destination_operand_iteration0 = source_operand1(4 terms) * source_operand2_iteration0(4 terms) + destination_operand_iteration0 destination_operand_iteration1 = source_operand1(4 terms) * source_operand2_iteration1(4 terms) + destination_operand_iteration1 destination_operand_iteration2 = source_operand1(4 terms) * source_operand2_iteration2(4 terms) + destination_operand_iteration2

~~destination_operand_iteration3 = source_operand1(4 terms) * source_operand2_iteration3(4 terms) + destination_operand_iteration3~~ [skip because source_operand2_iteration3 terms are zero]

destination_operand_iteration4 = source_operand1(4 terms) * source_operand2_iteration4(4 terms) + destination_operand_iteration4

~~destination_operand_iteration5 = source_operand1(4 terms) * source_operand2_iteration5(4 terms) + destination_operand_iteration5~~ [skip because source_operand2_iteration5 terms are zero]

destination_operand_iteration6 = source_operand1(4 terms) * source_operand2_iteration6(4 terms) + destination_operand_iteration6 destination_operand_iteration7 = source_operand1(4 terms) * source_operand2_iteration7(4 terms) + destination_operand_iteration7

4 terms needed for operand1 since the same 4 terms are used in each iteration.

A total of 4x8=32 terms are needed for operand2 since each iteration uses a different set of 4 terms.

ITERATING GROUP SUM OF MULTIPLE ACCUMULATE OPERATIONS

RELATED PATENT APPLICATIONS

This patent application is a continuation-in-part (CIP) of U.S. patent application Ser. No. 16/693,092, filed Nov. 22, 2019, which in herein incorporated by reference.

FIELD OF THE EMBODIMENTS

The described embodiments relate generally to graph stream processing. More particularly, the described embodiments relate to methods, apparatuses and systems for walk operations of single instruction, multiple data (SIMD) instructions, and iterating group sum of multiple accumulate operations.

BACKGROUND

A graph streaming processor (GSP) is a multi-threaded, single instruction, multiple data (SIMD) processor core. A GSP has many concurrently executing pipelines such as a SIMD arithmetic logic unit (ALU), scalar ALU, load pipe, store pipe, flow-control pipe, thread spawn and terminate pipe, and math co-processor. These pipes execute different types of instructions. If the hardware of a GSP is not capable of handling a particular SIMD width, the speed of the GSP slows down significantly, which slows down overall software operations. It is desirable to have a method, apparatus and system for optimizing GSP operations.

SUMMARY

An embodiment includes a computing system. The system includes a scheduler operative to schedule a single instruction, multiple data (SIMD) thread; one or more processors operative to execute the SIMD thread; and logic encoded in one or more non-transitory computer-readable storage media for execution by the one or more processors. When executed, the logic is operative to cause the one or more processors to perform operations including: initiating, by the scheduler, the SIMD thread, fetching, by the one or more processors, a plurality of instructions for the SIMD thread from a memory, determining, by a thread arbiter of the processor, at least one instruction of the plurality of instructions that is a walk instruction block, wherein the walk instruction block includes a walk-endwalk pair of instructions, wherein the walk instruction block includes a GSOMAC (Group Sum of Multiply Accumulate) instruction, iterating, a block of instructions within the walk-endwalk of instructions of the walk instruction block for a subset of channels of the SIMD thread, wherein the walk-endwalk instructions are responsible for iterating the block of instructions when a size of the SIMD thread is greater than a maximum native SIMD instruction width, and an execution mask is responsible for iterating the block of instructions when the size of the SIMD thread is less than the maximum native SIMD instruction width, wherein the walk instruction block includes a walk size, and wherein the walk size is a number of channels in the subset of channels of the SIMD thread that are processed in the iterating in association with the walk instruction block, providing, by the thread arbiter, the walk instruction block to a code block iterator, and executing, by the thread arbiter, the walk instruction block based on the walk size.

An embodiment includes a computer-implemented method. The method includes initiating, by the scheduler, the SIMD thread, fetching, by the one or more processors, a plurality of instructions for the SIMD thread from a memory, determining, by a thread arbiter of the processor, at least one instruction of the plurality of instructions that is a walk instruction block, wherein the walk instruction block includes a walk-endwalk pair of instructions, wherein the walk instruction block includes a GSOMAC (Group Sum of Multiply Accumulate) instruction, iterating, a block of instructions within the walk-endwalk of instructions of the walk instruction block for a subset of channels of the SIMD thread, wherein the walk-endwalk instructions are responsible for iterating the block of instructions when a size of the SIMD thread is greater than a maximum native SIMD instruction width, and an execution mask is responsible for iterating the block of instructions when the size of the SIMD thread is less than the maximum native SIMD instruction width, wherein the walk instruction block includes a walk size, and wherein the walk size is a number of channels in the subset of channels of the SIMD thread that are processed in the iterating in association with the walk instruction block, providing, by the thread arbiter, the walk instruction block to a code block iterator, and executing, by the thread arbiter, the walk instruction block based on the walk size.

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

FIG. 4 shows example software instructions for a SIMD thread that include walk instructions, according to some embodiments.

FIG. 8 shows example software instructions for a SIMD thread that include walk instructions, according to some embodiments.

FIG. 12A shows a CONV (convolution) of the 16×16×4 input with the 1×1×4 weight which generates a 16×16 output, according to an embodiment.

FIG. 12B shows the 16×16 error is GCONV'ed (group convolved) with the 16×16×4 input to generate the 1×1×4 error weight, according to an embodiment.

FIG. 19 shows operation of a SOMAC instruction with 4 terms, wherein the instruction size of the SOMAC instruction is 8, and wherein the instruction size sets the number of iterations performed by the SOMAC instruction, according to an embodiment.

DETAILED DESCRIPTION

The described embodiments are embodied in methods, apparatuses and systems for walk operations of single instruction, multiple data (SIMD) instructions. The walk operations described herein provide optimal hardware iteration for thread execution.

Figure 1:
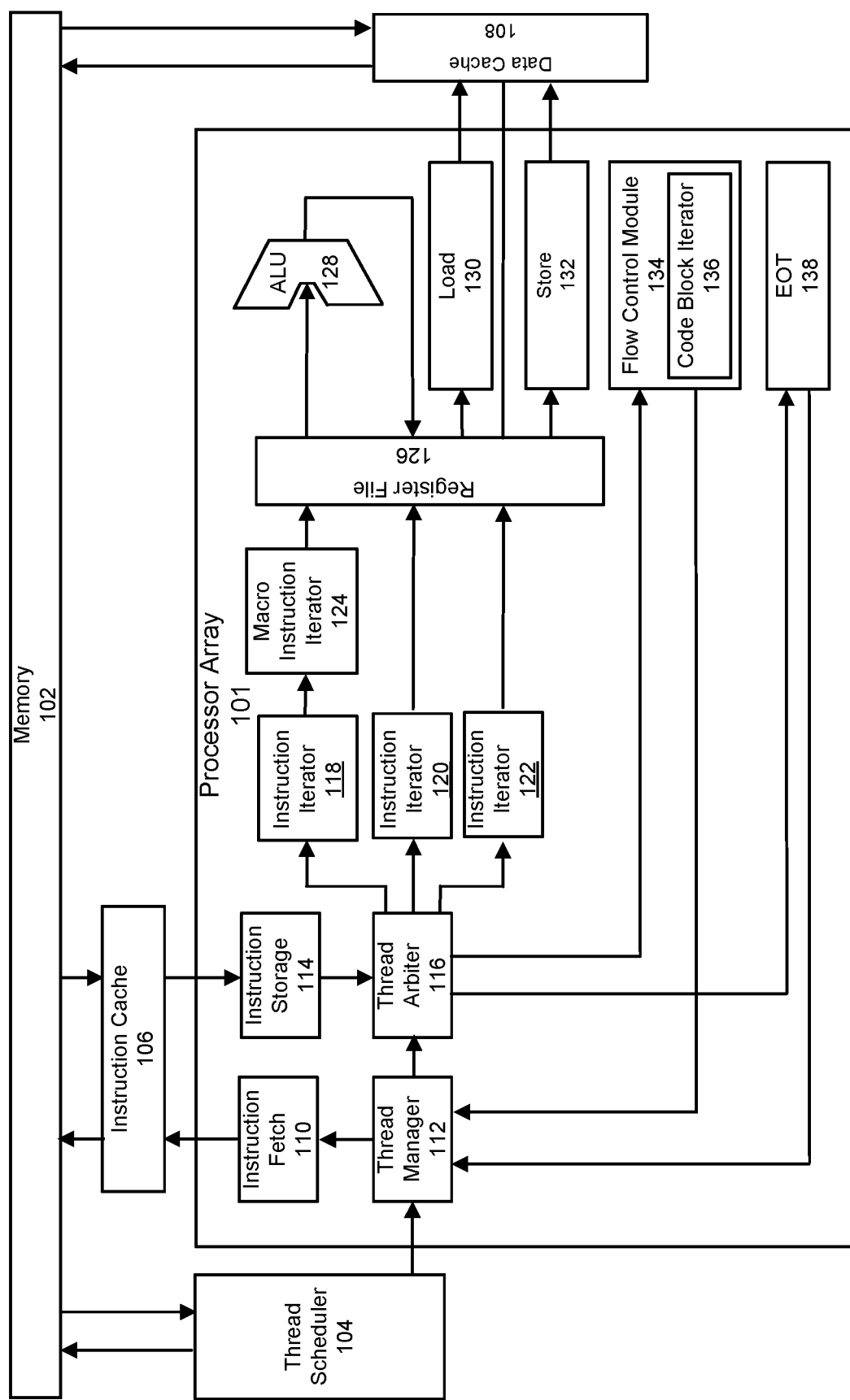
FIG. 1 is a block diagram of an example graph streaming processor, according to some embodiments.

FIG. 1 is a block diagram of an example graph streaming processor (GSP) 100, according to some embodiments. In various embodiments, GSP 100 includes a processor array 101, a memory 102, thread scheduler 104, instruction cache 106, and data cache 108.

GSP 100 is a SIMD processor core that has numerous, concurrently executing pipelines or pipes such as a SIMD arithmetic logic unit (ALU), scalar ALU, load pipe, store pipe, flow-control pipe, thread spawn, terminate pipe, math co-processor, etc. These pipes execute different types of instructions. In various embodiments, the arithmetic and logical instructions are executed in either the SIMD ALU (for SIMD operations) or scalar ALU (for scalar operations). The load and store instructions are executed in load and store pipes respectively. Complex math functions, such as sine, cosine, log, exponent, reciprocal, etc. are executed in the math co-processor.

In some example embodiments, GSP 100 has a maximum native SIMD instruction width of 64 bits. The actual maximum native SIMD instruction width may vary, depending on the particular implementation. Each of the execution pipelines are implemented with a certain SIMD width based on the typical throughput requirements for the targeted workloads. As described in more detail herein, single-instruction hardware iterators are present to process SIMD64 instructions through narrower pipelines. For example, the SIMD ALU may carry out its processing at different widths depending on the operand datatype and the math co-processor is SIMD4.

In various embodiments, a SIMD thread is an instance of a software program running on a processor. The SIMD thread includes the instructions, which perform operations on enabled channels during each walk iteration. The SIMD thread includes multiple sub-threads, where each sub-thread processes its own data. As such, the SIMD thread operates on multiple channels. In the aggregate, the sub-threads process the various, multiple data of the SIMD thread. A channel may be defined as a sub-thread among multiple sub-threads of a SIMD thread. The number of channels that the SIMD thread operates is based on the hardware architecture. Each of the data values being operated on is associated with an independent thread. In various embodiments, the SIMD thread has a SIMD width, which is the amount of data that the hardware can operate on with a single instruction. When processing a SIMD instruction with a native width as supported by the hardware, if the compute resource processes a subset of channels during every clock cycle, the system processes the entire SIMD instruction over multiple clock cycles. In various embodiments, a dispatch mask is walked to determine what is processed every clock.

Processor array 101 includes one or more processors. In an example, the processor array may include 4 processors. In various embodiments, thread scheduler 104 is operative to schedule and initiate a SIMD thread, and the one or more processors are operative to execute the SIMD thread. For at least some embodiments, a thread is an instance of a program that is run on a processor. In various embodiments, the SIMD thread includes a set of instructions operating on input data and producing output data. In various embodiments, logic is encoded in one or more non-transitory computer-readable storage media for execution by the one or more processors. When executed, the logic is operative to cause the one or more processors to perform various operations of embodiments described herein.

Memory 102 includes memory where software places all the buffers that are required for execution of the GSP. In various embodiments, the GSP includes multiple processors that process multiple threads in parallel. Memory 102 includes the command and data buffers in addition to other buffers. In an embodiment, memory 102 may be any of first-in-first-out (FIFO) buffers, dynamic random access memory (DRAM), static RAM (SRAM), or magnetic RAM (MRAM).

Thread Scheduler 104 includes a series of identical stages each of which may check on the availability of resources for running a thread (e.g., thread slot, registers, etc.) across an array of processors and dispatching the thread. Execution of an acyclic graph with multiple nodes is carried out by depth-wise mapping of the nodes to the stages. The commands to schedule threads are held in command buffers, which are written to by threads of a stage and read from by the next stage. Each SIMD thread is associated with a thread ID. In the described embodiments, thread ID and SIMD thread ID are used interchangeably. SIMD thread includes a dispatch mask. A dispatch mask holds the status of a SIMD channel. Hence, at least one register bit per channel is required. A dispatch mask is stored in thread manager 112 and has the same size as SIMD width. The thread scheduler 104 initiates the dispatch mask.

Instruction cache 106 is a read-only cache for servicing the instruction cache-line fetch requests from the threads running on the processor array. Data cache 108 receives data from memory 102 and load module 130. Data cache 108 is a read-write cache for servicing the data fetch and write-back requests from the threads running on the processor array. Data cache 108 can write back to memory as well as update register file 126.

Processor array 101 includes a module instruction fetch 110, a thread manager 112, an instruction storage 114, a thread arbiter 116, instruction iterators 118, 120, and 122, a macro instruction iterator 124, a register file 126, an arithmetic logic unit (ALU) 128, a load 130, a store 132, a flow control 134, a code block iterator 136, and end of thread (EOT) 138.

Instruction fetch 110 initiates the fetch of a cache-line (64 Bytes) of instructions from memory 102 via the instruction cache 106. Thread manager 112 holds the state associated with each thread. This includes the initial information at thread dispatch including the dispatch mask, thread ID, and program pointer, along with the state generated during execution of the thread. In various embodiments, thread manager 112 receives a thread dispatch mask from thread scheduler 104. Thread manager 112 also receives a flow control mask from flow control module 134. In various embodiments, thread manager 112 combines the dispatch mask with the flow control mask. Thread manager 112 sends the combined thread dispatch mask and flow control mask to code block iterator 136. Other example embodiments directed to the processing of masks are described in more detail herein in connection with FIG. 7, for example.

Each thread has 2 cache-line slots that enable the fetch of a second cache-line when the first cache-line is returned by the instruction cache. The first cache line is stored in instruction storage 114 when the second cache line is being fetched. Thus, the execution of one cache-line worth of instructions overlaps with the fetch of the second cache-line of instructions.

The availability of instructions and the absence of any dependency on prior instructions pending completion of execution make a thread a candidate for scheduling instructions into the different execution compute resources (e.g., pipelines, etc.). The thread arbiter 116 is responsible for fair scheduling of instructions into each of the compute resources such as load 130, store 132, and flow control 134.

Each compute resource (e.g., load 130, store 132, and flow control 134) is associated with an instruction iterator (e.g., instruction iterators 118, 120, and 122). An instruction iterator determines the data type required for each instruction. The instruction iterator is responsible for sub-cycling each SIMD instruction for as many phases as are required to complete the processing of the instruction.

In some embodiments, on-chip register resources hold program variables in the processor core, which is a valuable resource that is shared by the multiple concurrent threads. In some embodiments, each of the SIMD registers is 512 bits in the GSP, which enables a SIMD64 8 bits to occupy a single register slot. Larger datatypes (e.g., 16 bits, 32 bits, 64 bits, 128 bits, etc.) may require multiple registers. Having a lower SIMD width reduces the registers needed to hold these larger datatype variables.

Multiple phases would be required because of a narrower register file and/or an execution pipeline than the instruction SIMD width. For example, the data read out of the register file and/or the width of the execution pipeline is less than the instruction SIMD width. Multiple phase execution or iterative execution depends on the dispatch mask and the data type. Instruction iterator determines the number of clock phases required for execution of an instruction based on the data type and dispatch mask.

Macro instruction iterator 124 module is responsible for handling the SOMAC instructions with an instruction size. It controls the sequencing of the first source operand read and its zero-detection, the second source operand read, its zero, the destination operand read, and the update.

Source and destination operands for each instruction are stored in a register file 126. All operations carried out by the processor are on registers in register file 126. Data can be loaded from memory 102 into the register file 126 while data can be stored in memory 102 from the register file 126. Register file width is same as channel width.

The processor array 101 holds a number of compute resources for performing the various operations needed in the execution of code. These include the math computes, accesses from and to memory, conditional operations and thread termination. There are also multiple instances of these modules based on the throughput requirements for each of the operations. ALU 128 performs the math operations including add/subtract/multiply/divide, compares, bit-wise logical operations, and data movement. In an embodiment ALU 128 is an array of 4 ALUs, and may be referred to as an ALU pipeline. Load 130 issues instructions to data cache 108 to fetch data from memory 102 and write into register file 126. Store 132 is used for sending the results in register file 126 to memory 102. The compute resource width is the same as register file width. Register file width may or may not be same as SIMD width. Compute resource width is generally narrower than SIMD width.

Flow control 134 handles all conditional statements such as IF/ELSE/ENDIF, WHILE, ENDLOOP, BREAK, CONTINUE etc. In various embodiments, flow control 134 is a special pipeline in that its operations determine the execution on an entire instruction code block within its scope. Hence, in some embodiments, a single-instruction hardware iterator is not used for flow control instructions. Flow control 134 also affects the execution of other instructions by determining the mask of the SIMD thread. In the GSP, the flow-control pipe may be SIMD32, for example. A SIMD64 thread may be iterated at SIMD32 at an instruction block level in the presence of flow control instructions.

Code block iterator 136 is a part of the flow-control pipeline and services the WALK/ENDWALK instructions. EOT 138 handles the thread termination command and releases all resources occupied by the thread in the processor.

In other implementations, GSP 100 may not have all of the components shown and/or may have other elements including other types of elements instead of, or in addition to, those shown herein.

While GSP 100 performs embodiments described herein, in other embodiments, any suitable component or combination of components associated with GSP 100 or any suitable processor or processors associated with GSP 100 may facilitate performing the embodiments described herein.

As described in more detail herein, embodiments dynamically modify the SIMD width using a walk/endwalk mechanism, or walk instructions. Such walk instructions enable the iteration of the SIMD thread at lower SIMD widths. In various embodiments, the particular size of the SIMD thread and the particular size of the lower SIMD widths may vary, depending on the specific hardware implementation. For example, a thread launched with any SIMD width greater than N (e.g., 64, as determined by the hardware architecture) will start execution with a walk instruction in order to reduce the SIMD width to less than or equal to the native maximum width of N. In some example embodiments, before hitting a flow control instruction, the walk instruction is used to reduce the SIMD width to less than or equal to N' (e.g., 32, as determined by the hardware architecture). If a code block in the program is causing a spike in the register resource utilization, the SIMD width can be further reduced to less than N' (e.g., 32, as determined by the hardware architecture) with a walk instruction. The endwalk instruction is placed at the tail end of the block of code which needs to operate at the lower SIMD width and began with a walk instruction. For example, the walk/endwalk instruction pair is responsible for iterating the size of the thread for greater than SIMD64, and the execution mask for less than or equal to SIMD64.

A control flow instruction such as IF, ELSE, ENDLOOP, etc. are executed in the flow-control pipe. Maximum supported SIMD width of these instructions are not all equal. For example, a flow control pipe might support 32 channels per instruction, but some channels or pipes may support 64 channels per instruction. Note that various example embodiments are described herein in the context of 64 channels, 32 channels, etc. for illustrative purposes. The particular SIMD widths and corresponding number of data channels may vary, and will depend on the particular implementation, including the hardware architecture. A kernel could have multiple instructions, which are executed by different execution pipes of the GSP, and they could have different SIMD width. As described in more detail herein, embodiments of the walk instructions enable hardware iteration. When a compiler inserts a walk and endwalk instruction around a code block with a walk size, the hardware iterates the code block over all the channels of the thread. As such, the SIMD thread may be bigger than the maximum supported SIMD width of the execution pipe. Also, the thread iterator can work at different granularity of size like 8×8/64, 8×4/32, 4×4/16, etc.

Figure 2:
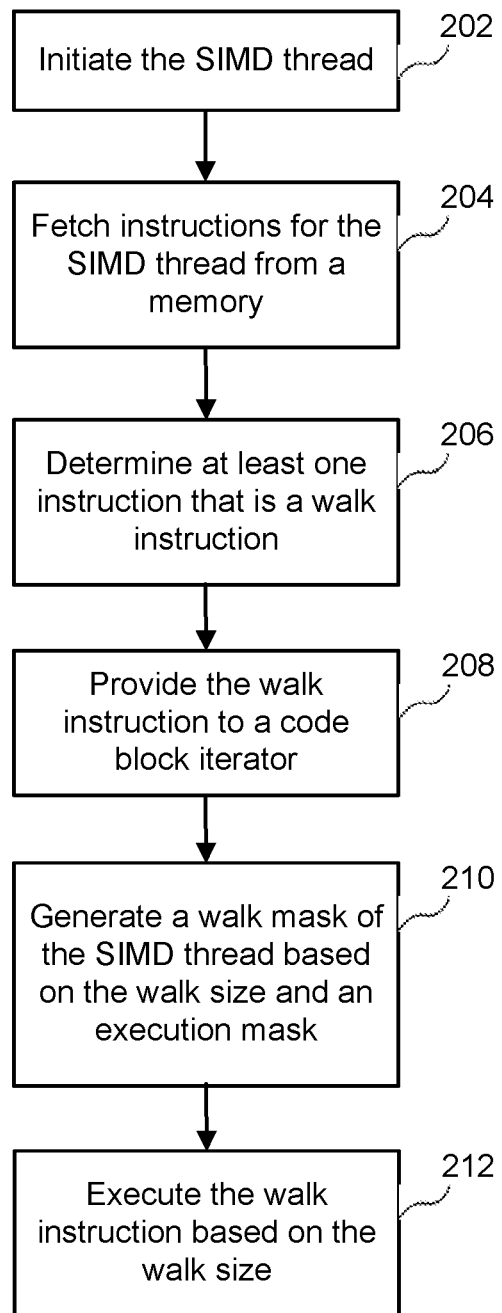
FIG. 2 is an example flow diagram for performing walk operations of SIMD instructions, according to some embodiments.

FIG. 2 is an example flow diagram for performing walk operations of SIMD instructions, according to some embodiments. Referring to both FIGS. 1 and 2, a method is initiated at block 202, where a scheduler of the system initiates the SIMD thread. In various embodiments, the scheduler is operative to schedule and initiate the SIMD thread, and one or more processors are operative to execute the SIMD thread.

In various embodiments, the SIMD thread includes a dispatch mask. In some embodiments, the dispatch mask indicates which channels are enabled and/or indicates which channels are disabled at an initial point in time. In various embodiments, the channels are associated with data cache 108. The dispatch mask indicates which channels of data cache 108 are initially enabled or disabled across an entire SIMD width. When a channel is enabled, the system may fetch data via that enabled channel and then process the data accordingly. When a channel is disabled, the system ignores data from the disabled channel until the given channel is enabled.

In various embodiments, the dispatch mask has a single bit for every channel, where each bit indicates whether enabled or disabled. For example, in some embodiments, a "1" bit may indicate that the corresponding channel is enabled, and a "0" bit may indicate that the corresponding channel is disabled.

Figure 3:
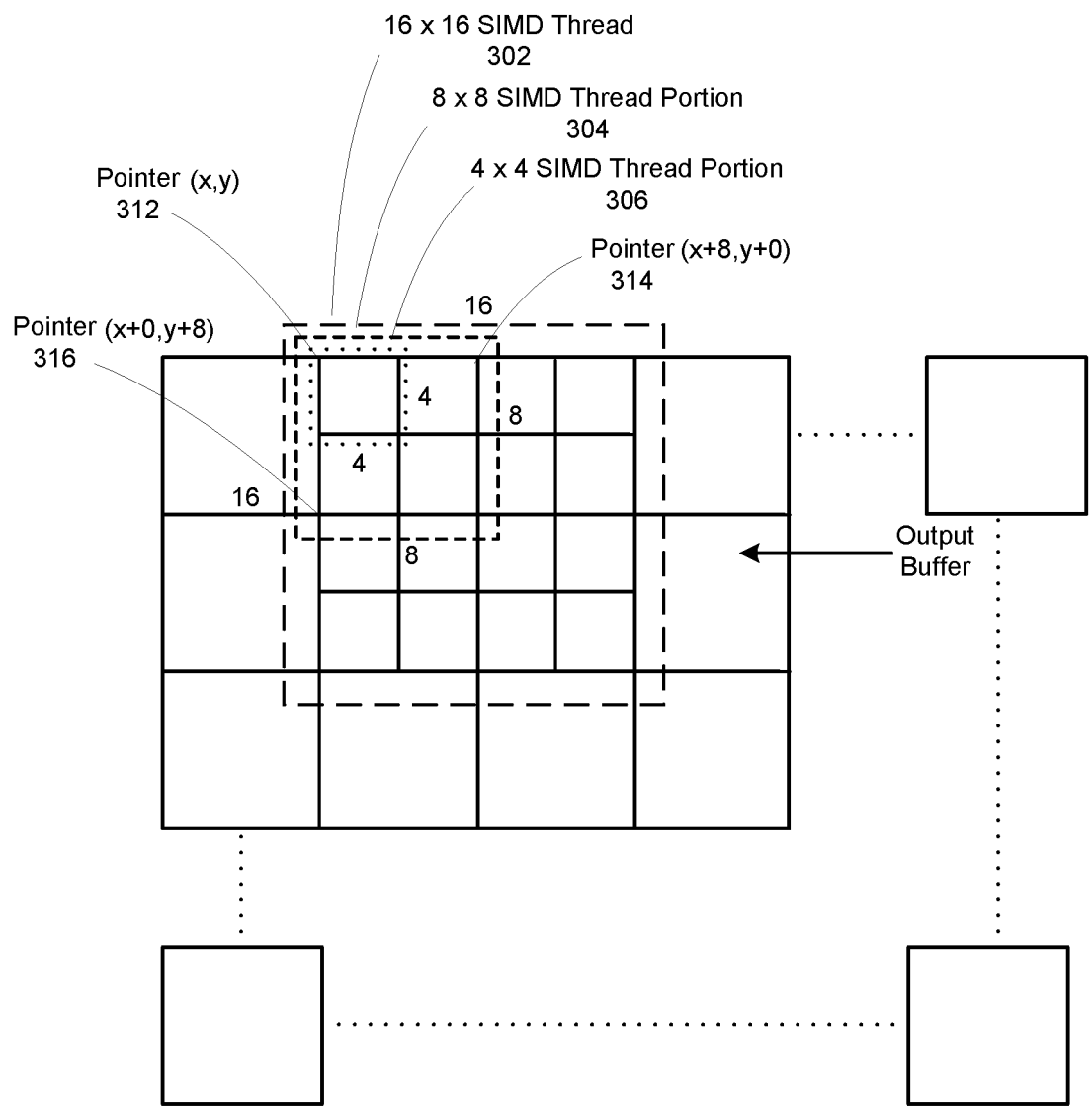
FIG. 3 is a block diagram of an example SIMD kernel, according to some embodiments.

FIG. 3 is a block diagram of an example SIMD kernel 300, according to some embodiments. In various embodiments, the system divides SIMD kernel 300 into separate executable portions based on the hardware capabilities of the system. In some example embodiments, in operation, the system may execute 16×16 SIMD thread 302 of SIMD kernel 300 before executing a subsequent portion of SIMD kernel 300. 16×16 SIMD thread 302 is demarcated by dashed lines. The particular size of maximum size SIMD thread portion will vary depending on the particular implementation.

At block 204, one or more processors of the system fetches instructions for the SIMD thread from a memory such as memory 102 of FIG. 1. Memory 102 may be RAM memory, for example. In this particular example, the 16×16 SIMD thread 302 is the current portion to be executed. In various scenarios, there may be one or more previous 16×16 SIMD thread portions to be executed before 16×16 SIMD thread 302, and/or there may be one or more subsequent 16×16 SIMD thread portions to be executed after 16×16 SIMD thread, depending on the particular implementation. For ease of illustration, the following examples are directed to the current 16×16 SIMD thread 302.

As shown in FIG. 3, the 16×16 SMID thread is broken down into 8×8 SIMD blocks, which are further broken down to 4×4 SIMD blocks.

As described in more detail below, the system may further divide 16×16 SIMD thread 302 into one or more 8×8 SIMD thread portions or SIMD blocks, such as 8×8 SIMD thread portion 304. As described in more detail below, execution of a given set of instructions in a given 8×8 SIMD thread portion is referred to a walk. The system may further divide one or more of the 8×8 SIMD threads into one or more 4×4 SIMD thread portions or SIMD blocks, such as 4×4 SIMD thread portion 306. As described in more detail below, execution of a given set of instructions in a given 4×4 SIMD thread portion is also referred to a walk. In various embodiments, a given walk instruction that is included in another walk instruction may be referred to as a nested walk. Further example embodiments directed to walks and nested walks are described in more detail herein.

At block 206, a thread arbiter of the processor determines at least one of the fetched instructions that is a walk instruction. In various embodiments, the walk instruction iterates a block of instructions (code-block) for a subset of channels of the SIMD thread. In various embodiments, the walk instruction includes a walk size, where the walk size is a number of channels in the subset of channels of the SIMD thread that are processed in a walk iteration in association with the walk instruction.

In various embodiments, a walk instruction involves processing data from subset of channels among a group of channels during execution of an iteration of a block of instructions for the SIMD thread. In various embodiments, the system manages the processing of the channels by managing a walk pointer index and a walk mask for each walk iteration. The pointer index may also be referred to as a walk index. For example, a walk instruction may cause the system to execute the 8×8 SIMD thread 304, where the walk instruction includes a pointer that indicates a walk starting point. The walk instruction may include a pointer 312 that points to the upper-left corner of 16×16 SIMD thread, which is also the upper-left corner of 8×8 SIMD thread portion 304. In various embodiments, the pointers may be indexed in a pointer index, and the walk mask and the execution mask designate that the channels are to be processed during the walk iteration.

In some embodiments, pointer 312 may include an index (e.g., x,y or strX, strY) that indexes start coordinates (e.g., 0,0) for executing a first portion of the SIMD thread. For example, the system may first execute a first set of instructions corresponding to a first walk, where the starting x-coordinate (strX) is 0 and starting y-coordinate (strY) is 0, or (0,0). Once finished, the system may then execute a subsequent set of instructions corresponding to a second walk, where the starting x-coordinate (strX) is 8, and starting y-coordinate (strY) is 0, or (8,0), etc. In this particular example, the set of instructions is an 8×8 SIMD thread portion, where the walk instruction includes a walk size (e.g., 8×8).

As indicated herein, a given 8×8 walk instruction may have nested 4×4 walk instructions. As such, during execution of an 8×8 walk instruction, the system may execute one or more 4×4 walk instructions. As such, the system may first execute a first set of instructions corresponding to a first walk having a walk size of 4×4, where the starting x-coordinate (strX) is 0 and starting y-coordinate (strY) is 0, or (0,0). Once finished, the system may then execute a subsequent set of instructions corresponding to a second walk having a walk size of 4×4, where the starting x-coordinate (strX) is 4 and starting y-coordinate (strY) is 0, or (4,0). In this particular example, the set of instructions is an 4×4 SIMD thread portion, where the walk instruction includes a walk size (e.g., 4×4). As such, the system may advance the pointer from (0,0) to (4,0) to (0,4) to (4,4), which would complete the 8×8 SIMD thread portion starting at (0,0). As indicated in the above example, after the system completes the 8×8 SIMD thread portion starting at (0,0), the system initiates execution of the next the 8×8 SIMD thread portion starting at (8,0), including any nested walks starting at (8,0), then (12,0), then (8,4), then (12,4), for example.

As described in more detail herein, a given walk instruction is associated with other types of instructions. Such other types of instructions may include load/store instructions, arithmetic instructions, flow control instructions, etc.

At block 208, the thread arbiter provides the one or more walk instructions to a code block iterator. As indicated above, the code block iterators iterates through portions of the SIMD thread 302 one at a time until all portions have been executed. In the example embodiment of FIG. 3, 16×16 SIMD thread 302 of SIMD kernel 300 is divided into 4 equal 8×8 SIMD thread portions. An example 8×8 SIMD thread portion 304 is demarcated by dashed lines. In some embodiments, in operation, the system walks or executes 8×8 SIMD thread portion 304 of SIMD kernel 300 first based on pointer 312 and before executing a subsequent portion of SIMD thread. For example, after executing 8×8 SIMD thread portion 304, the system moves the pointer to a new 8×8 SIMD thread portion such as the 8×8 SIMD thread portion to the immediate right of 8×8 SIMD thread portion 304, and then executes that 8×8 SIMD thread portion. The system may subsequently increment the pointer (e.g., from pointer 312 to pointer 314) by incrementing the strX, strY coordinates. The system then executes the 8×8 SIMD thread portion immediately below 8×8 SIMD thread portion 304, and so on until all of the 8×8 SIMD thread portions of the larger 16×16 SIMD thread 302 have been executed. In this example, the system executes the SIMD thread portions from left-to-right and from top-to-bottom.

In some embodiments, the system advances from one set of instructions to the next set of instructions by moving a pointer from one x,y coordinate to the next. In some embodiments, the system moves the pointer by incrementing the x coordinate and/or the y coordinate such that the pointer moves left-to-right and from top-to-bottom. Using x,y coordinates, x increases from left-to-right, and y increases from top-to-bottom. The particular pattern may vary and will depend on the particular implementation.

In various embodiments, the system may further divide each of the 8×8 SIMD thread portions into 4 equal 4×4 SIMD thread portions. An example 4×4 SIMD thread portion 306 is demarcated by dotted lines. In some embodiments, in operation, the system executes the SIMD thread portions from left-to-right and from top-to-bottom. The particular pattern may vary and will depend on the particular implementation. As such, the system executes 4×4 SIMD thread portion 306 of SIMD kernel 300 before executing a subsequent portion of SIMD thread. For example, the system may first execute the 4×4 SIMD thread portion 306. The system may then execute the 4×4 SIMD thread portion to the immediate right of 4×4 SIMD thread portion 306. The system may subsequently execute the 4×4 SIMD thread portion immediately below 4×4 SIMD thread portion 306, and so on until all of the 4×4 SIMD thread portions of the larger 8×8 SIMD thread 304 have been executed.

At block 210, the code block iterator generates a walk mask of the SIMD thread. As indicated herein, the walk mask indicates the subset of channels that are enabled and/or disabled during a particular walk iteration of executing the instructions of the SIMD thread. In various embodiments, the code block iterator generates the walk mask of the SIMD thread based at least on the walk size and an execution mask. In various embodiments, the execution mask and the walk mask are masks that are applied when performing the instructions for the SIMD thread during a particular iteration of executing instructions for the SIMD thread. In various embodiments, the execution mask and the walk mask are updated for each walk iteration. In various embodiments, and for each walk iteration, the execution mask and the walk mask are updated based at least in part on the flow control mask. In various embodiments, when the system executes the SIMD thread, the system performs multiple iterations, using a different walk mask for each iteration.

At block 212, the thread arbiter executes the walk instruction based on the walk size. As indicated herein, thread arbiter further executes the walk instruction based on the walk mask and the execution mask. In various embodiments, the code block iterator execution mask is a mask that is applied when performing the instructions during a particular iteration of executing instructions for the SIMD thread.

A walk instruction walks a corresponding execution mask during execution of an iteration of the instructions for the SIMD thread. During the iteration, the walk instruction walks the execution mask to process enabled channels. The system generates a new execution mask for each iteration of executing instructions for the SIMD thread. For example, an execution mask 1 includes walk mask 1, an execution mask 2 includes walk mask 2, etc.

In various embodiments, an execution mask is a combination of the dispatch mask, a walk mask, and associated flow controls (e.g., if/while instructions), where the execution mask, dispatch mask, and walk mask create a hierarchy of masks.

In various embodiments, a walk mask is a subset of the dispatch mask. A walk mask indicates which channels are enabled and/or indicates which channels are disabled during a particular iteration of executing instructions for the SIMD thread. In effect, the walk mask accesses a corresponding subset of the channels in the dispatch mask.

In various implementations, the walk masks may access channels in a predetermined order. For example, a first walk mask may access a first set of channels (e.g., channels 1-4). The second walk mask may access a set of subsequent channels (e.g., channels 5-8) that are different from those previously accessed and based on the first walk mask.

Similarly, a third walk mask may access a set of subsequent channels (e.g., channels 9-12).

In some embodiments, the flow control is a subset of a walk mask (and the corresponding dispatch mask). The flow control may disable any of the enabled channels, which may have been initially enabled by the dispatch mask. In some embodiments, the flow control may also enable a channel that had been disabled by the dispatch mask. The flow control may also enable a channel that had been disabled by the flow control of a previous walk mask.

In various embodiments, the code block iterator then executes the walk instruction using the walk mask. In various embodiments, the code block iterator of the system initiates/executes a walk instruction during execution of a first iteration of executing instructions for the SIMD thread. During a given walk, the system iterates through a portion of the channels of the execution mask. The dispatch mask is a superset of the walk masks. There are multiple walk masks that cover different portions of the dispatch mask (e.g., walk mask 1 through walk mask N). The system ends the walk instruction after the system completes the walk instruction. Further example embodiments directed to performing walk operations are described in detail herein, in FIG. 4 through FIG. 6, for example.

FIG. 4 shows example software instructions for a SIMD thread 400 that include walk instructions, according to some embodiments. In this example embodiment, the SIMD thread size is 16×16. Shown are a walk instruction 402, a corresponding endwalk instruction 404, and associated instructions 406. Also shown are a walk instruction 412, a corresponding endwalk instruction 414, and associated instructions 416. As shown, walk instruction 412 is nested in walk instruction 402. Walk instruction 402 may be referred to as a parent walk instruction, and walk instruction 412 may be referred to as a nested or child walk instruction. For ease of illustration, this particular example embodiment involves one parent instruction and one child instruction. There may be any number parent walk instructions, and each parent walk instruction may include one or more nested child walk instructions. Furthermore, each child walk instruction may itself include one or more nested child walk instructions. Example embodiments directed to SIMD thread 400 are described in more detail below in connection with FIG. 5.

Figure 5:
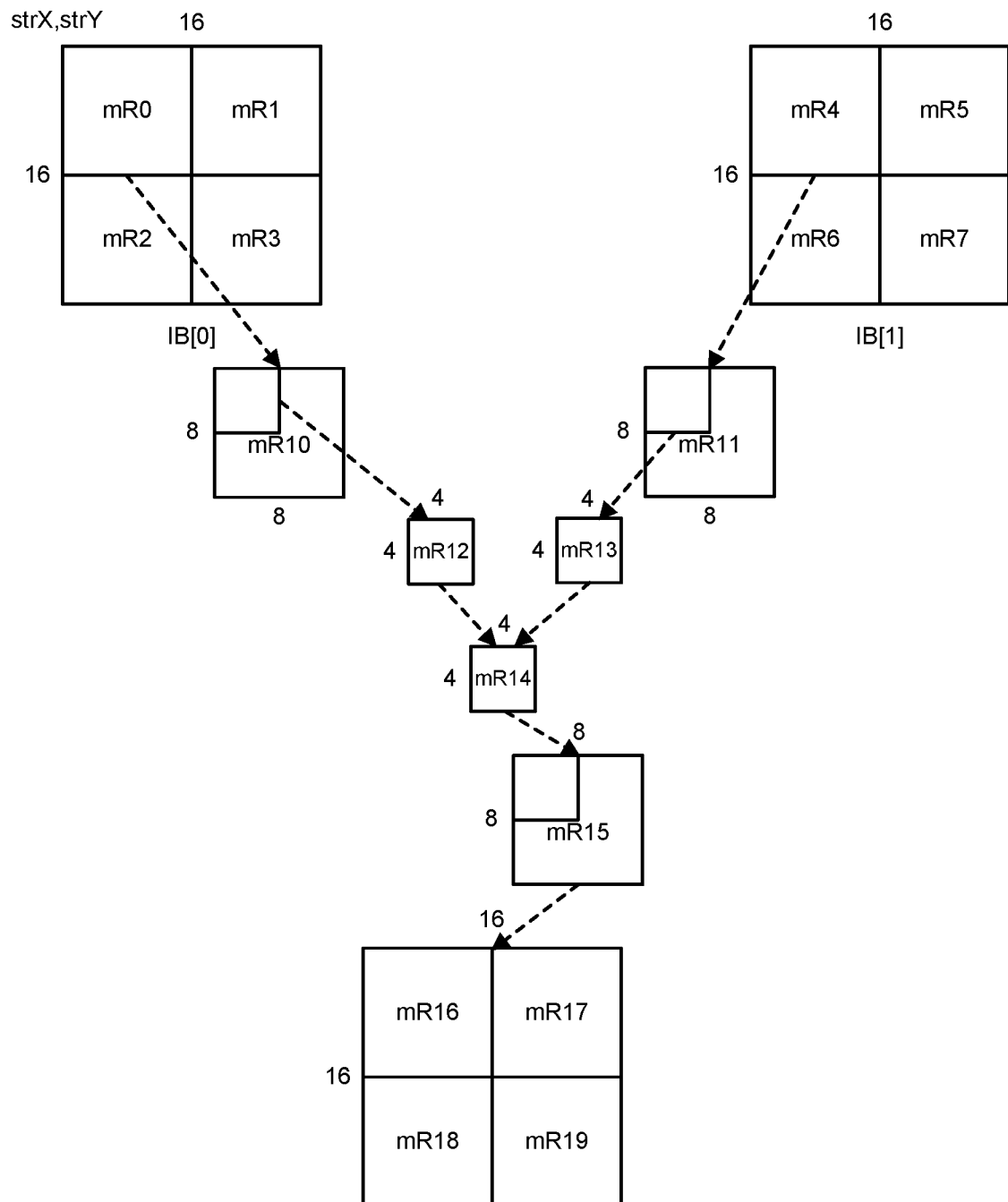
FIG. 5 is a block diagram of example registers, according to some embodiments.

FIG. 5 is a block diagram of example registers, according to some embodiments. Referring to both FIGS. 4 and 5, the software instructions load 16×16 data from an input buffer IB[0] to a register mR0, and loads 16×16 data from an input buffer IB[1] to a register mR4. In this example embodiment, register mR0 is associated with one 16×16 SIMD thread, and register mR4 is associated with a second 16×16 SIMD thread.

The system then initiates walk instruction 402, which includes a walk size of 8×8. During the walk operation, the system iterates a portion of the SIMD instruction, having a walk size of 8×8. For example, the system moves data from register wmR0 to register mR10. In parallel, the system also moves data from register wmR4 (not shown) to register mR11.

Note that register mR0 is the same as register wmR0, and register mR4 is the same as register wmR4. The "w" denotes that the MOV instruction increments the register number or position, also referred to as a walk index. The first register position in the instruction indicates that the register is a destination register in the operation, and the second register position in the instruction indicates that the register is a source register in the operation. For example, registers wmR0 and wmR4 are source registers, whereas mR10 and mR11 are destination registers.

In various embodiments, the walk size defines the size of the thread iteration or "walk," (e.g., walksize. 8×8). In some embodiments, there may be multiple registers per thread maintained in a shader quad of the GSP (e.g., "walk_size_indx," "walk_indx," and "walk_step_size." In some embodiments, the "walk_size_indx" pointer increments at 8×8/64×1 steps, and the "walk_indx" pointer increments with in the 8×8 block. In some embodiments, the walk_step_size defines the size of increments at the ENDWALK instruction. After the endwalk program pointer jumps back to the instruction after the walk, unless endwalk finishes iterating the entire region (parent size) specified in the endwalk instruction.

As indicted herein, the system may divide portions of the instructions of the SIMD thread into yet further divisions. As such, the system initiates a nested or second walk instruction during execution of a second iteration of executing instructions for the SIMD thread. The system then ends the second walk instruction. In this example embodiment, if register mR10==mR11, nested or child walk instruction 412 is executed. As shown, child walk instruction 412 has a walk size of 4×4.

In this example embodiment, because the second level of walk is inside the IF instruction, all of the channel may not be valid (or enabled). The system creates a "walk mask" by ANDing a flow control (FC) mask and dispatch mask. In some embodiments, the system may create the dispatch mask at every increment of outer most walk equal to the walk size (which is 8×8/64 bit mask in this example). The inner/child walk instruction 412 performs in mask mode. This means that if all of the walk masks corresponding to the next walk increment are zero, that block having no associated enabled channels is skipped and incremented to the next valid block having data associated enabled channels.

In various implementations, the second walk mask accesses channels in a predetermined order. For example, the first walk mask may access the first contiguous channels (e.g., channels 1-4).

For example, if there is a 64-bit dispatch mask that is divided into 4 channels for each walk iteration, the system associates each portion (4 channels) with a walk mask (e.g., walk mask 1, walk mask 2, walk mask 3, walk mask 4, etc.). The system walks the 64-bit dispatch mask 16 times, applying a different walk mask of the 16 walk masks during each iteration. In other words, a different walk mask is applied for each iteration.

If all of the channels are disabled for a given walk mask, the system may skip the walk for those disabled channels. If at least one channel is enabled for a given walk mask, the system performs the walk for the enabled channel(s). In other words, in various embodiments, the system does not collapse the disabled channels. The system runs through all channels of a walk even if some may ultimately be disabled. In some embodiments, the system may collapse disabled channels (or consolidate enabled channels) in order to reduce the number of walks. Whether channels are collapsed or not, the number of walks may vary, and will depend on the particular implementation.

Referring still to both FIGS. 4 and 5, the system moves data from register wmR10 to register mrR12, and moves data from register wmR11 to register mrR13. The system then adds the data from registers mR12 and mR13 and stores the sum in register mR14. The system then moves the sum from register mR14 to register wmR15, and then ends the walk based on endwalk instruction 414.

At this point in the example embodiment, after the system ends the walk operation of walk instruction 412, the system continues with the walk operation of walk instruction 402. They system ends the IF and moves the data from register wmR15 to register wmR16, and then ends the walk based on endwalk instruction 404.

After the system ends the walk operation of walk instruction 402, the system continues with the instructions of the SIMD thread and stores data in registers mR16, mR17, mR18, and mR19.

Figure 6:
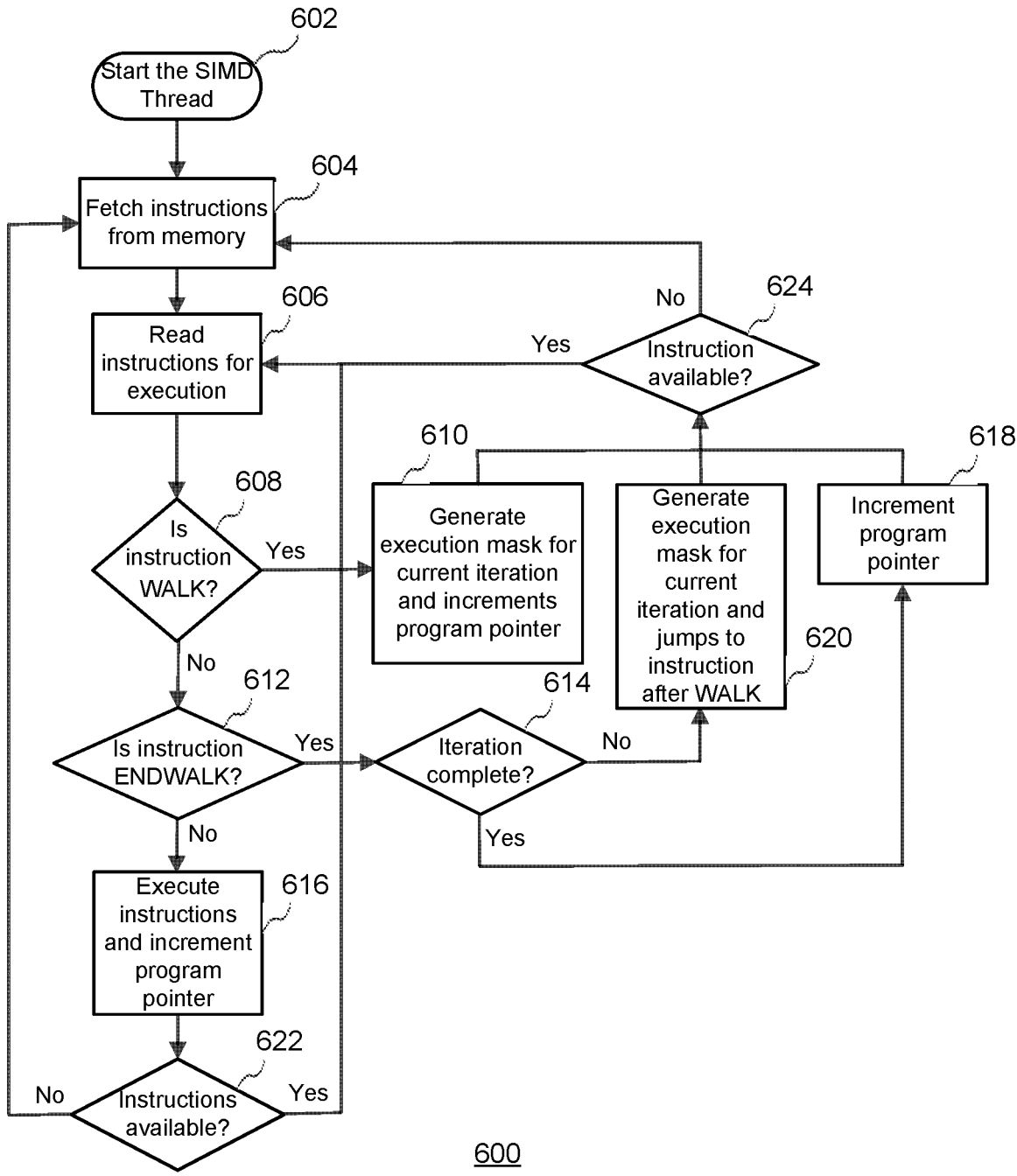
FIG. 6 is another example flow diagram for performing walk operations of SIMD instructions, according to some embodiments.

FIG. 6 is another example flow diagram for performing walk operations of SIMD instructions, according to some embodiments. Referring to both FIGS. 1 and 6, a method is initiated at block 602, where thread scheduler 104 of system initiates or starts a SIMD tread. At block 604, one or more processors of the system fetch instructions for the SIMD thread from a memory such as memory 102 of FIG. 1. Memory 102 may be RAM memory.

At block 606, a thread arbiter of the system (e.g., system processors) reads the instructions for execution. At block 608, the thread arbiter of the system determines from the read instructions if any of the instructions are instructions for a WALK (e.g., walk instructions). If yes at block 608, the thread arbiter provides the walk instruction to a code block iterator, and the flow continues to block 610. If no at block 608, the flow continues to block 612.

At block 610, the system generates an execution mask for the current iteration. The system also increments a program pointer. As described herein, in various embodiments, the system determines a walk size based on the walk instruction. In various embodiments, each walk instruction includes a walk size. The system then generates a walk mask of the SIMD thread based on the walk size and an execution mask.

At block 612, the system determines if any of the instructions are instructions for an ENDWALK. If yes at block 612, the flow continues to block 614. If no at block 612, the flow continues to block 616.

At block 614, the system determines if the iteration is complete. If yes at block 614, the flow continues to block 618, where the system increments the program pointer. If no at block 614, the flow continues to block 620, where the system generates an execution mask for the current iteration and jumps to the instruction after the walk instruction. At block 616, the system executes instructions and increments the program pointer.

At block 622, the system determines if any more instructions are available. If no, the flow continues to block 604, where the system fetches more instructions from memory. If yes, the flow continues to block 606, where the system reads a next set of instructions for execution.

After completion of any of blocks 610, 618, and 620, the flow continues to block 624. At block 624, the system determines if any more instructions are available to be executed in the current set of instructions. If no, the flow continues to block 604, where the system fetches more instructions from memory. If yes, the flow continues to block 606, where the system reads instructions for execution.

Figure 7:
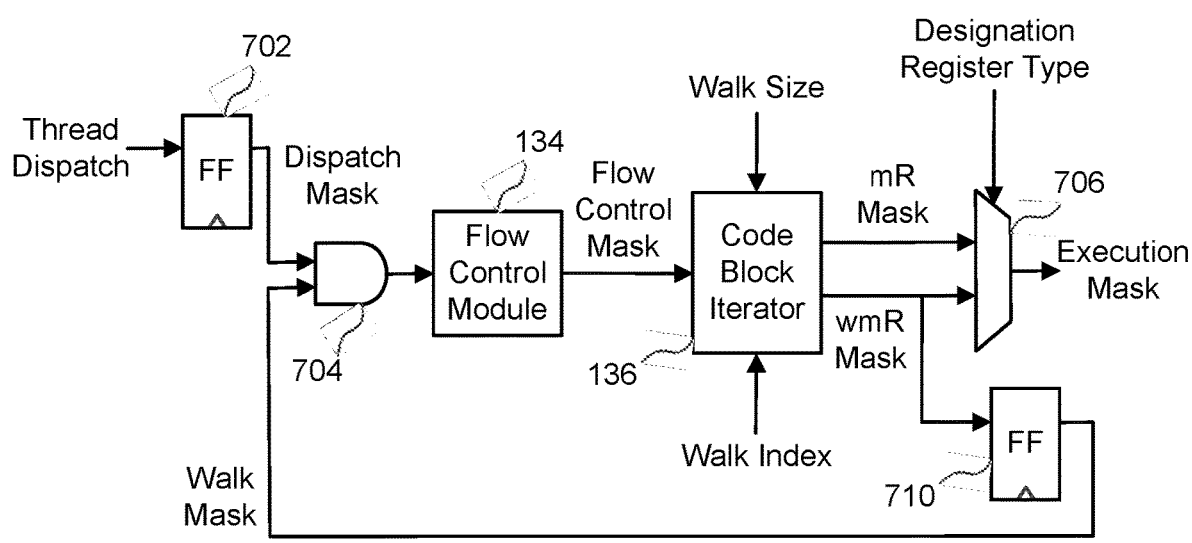
FIG. 7 is an example block diagram of a generation system, according to some embodiments.

FIG. 7 is an example block diagram of a mask generation system 700, according to some embodiments. Referring to both FIGS. 1 and 7, in various embodiments, a flip-flop register 702 receives a thread dispatch and output a dispatch mask, which is combined (e.g., ANDed) with a walk mask. Flow control module 134 outputs a flow control mask based on the combined dispatch mask and walk mask. In various embodiments, the dispatch mask contributes to the final execution mask. As such, only the channels that are enabled at dispatch, or a subset thereof, may be enabled in the final execution mask.

In various embodiments, code block iterator 136 of the system receives the flow control mask from flow control module 134. Code block iterator 136 also determines the walk size from a walk instruction of the SIMD thread. Code block iterator 136 also determines the walk index from the instructions of the SIMD thread. In various embodiments, the walk size and the walk index are for the current walk.

Code block iterator 136 generates two versions of an execution mask. One version may be referred to as a wmR mask and another version may be referred to as an mR mask. In various embodiments, for walk instructions, code block iterator 136 generates the wmR mask and the mR mask based on the combined dispatch mask and flow control mask, the walk size, and walk index. In various embodiments, the mR mask and wmR mask are a subset of the flow control mask. For non-walk instructions, the wmR Mask is the flow control mask, and the walk index is used to generate the mR Mask. In some embodiments, the mR mask or the wmR mask is selected as a final execution mask for the current instruction depending on the destination register type of the instruction received at a register 706. Code block iterator 136 sends the generated wmR mask and mR mask to an output buffer via register 706.

In various embodiments, the wmR mask and mR mask enable a subset of channels to be processed in the current walk iteration. The remaining channels are disabled during the current walk iteration, and may be enabled during other walk iterations. The wmR mask and an mR mask are updated for each walk iteration.

In various embodiments, code block iterator 136 applies the wmR mask to wmR registers. Code block iterator 136 also applies the mR mask to mR registers. In various embodiments, the sizes of the wmR registers are not tied to the current walk size. In other words, the sizes of the wmR registers may be larger than the current walk size and may correspond to one or more larger sizes indicated in the SIMD thread. Example embodiments directed to mR mask to mR registers are described in more detail herein, in connection with FIGS. 8 and 9, for example.

FIG. 8 shows example software instructions 800 for a SIMD thread that include walk instructions, according to some embodiments. In this example embodiment, the SIMD thread size is 16×16 (not shown). Shown are a walk instruction 802, a corresponding endwalk instruction 804, and associated instructions 806. Also shown are a walk instruction 812, a corresponding endwalk instruction 814, and associated instructions 816. As shown, walk instruction 812 is nested in walk instruction 802. Walk instruction 802 may be referred to as a parent walk instruction, and walk instruction 812 may be referred to as a nested or child walk instruction. For ease of illustration, this particular example embodiment involves one parent instruction and one child instruction. There may be any number parent walk instructions, and each parent walk instruction may include one or more nested child walk instructions. Furthermore, each child walk instruction may itself include one or more nested child walk instructions. Example embodiments directed to SIMD thread 800 are described in more detail below in connection with FIG. 9.

Figure 9:
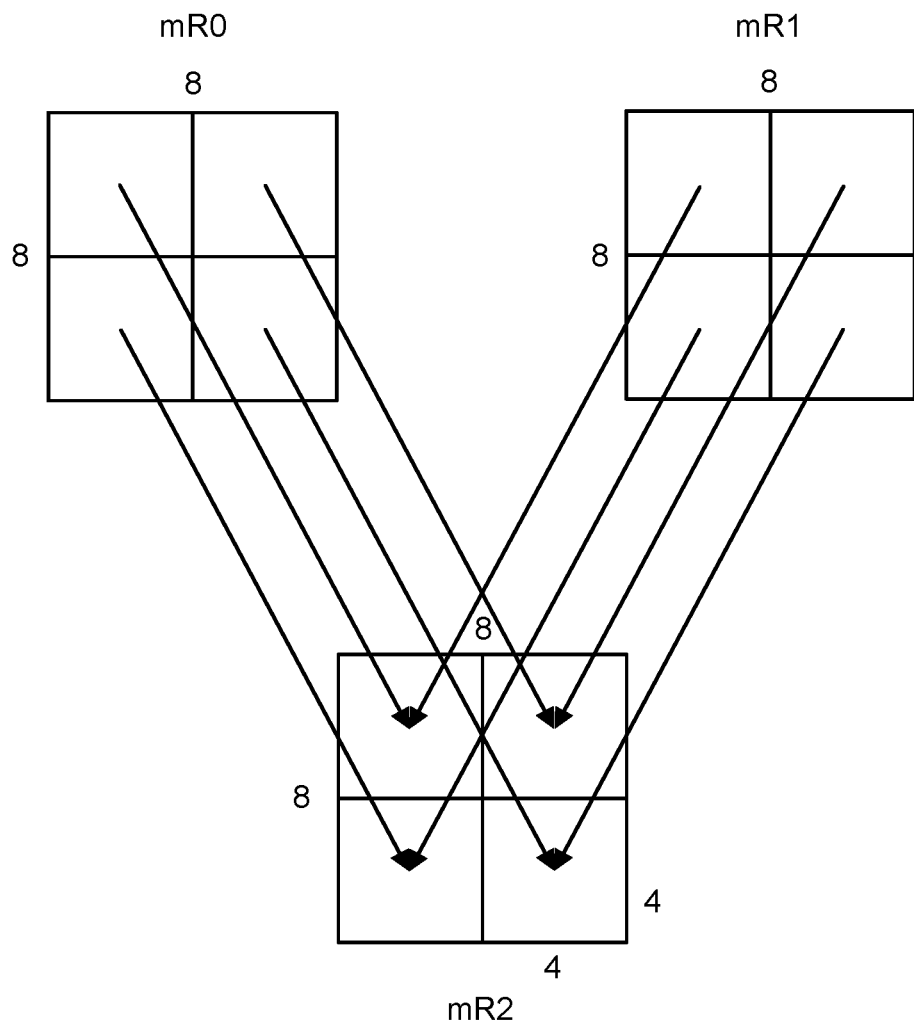
FIG. 9 is a block diagram of example walk registers, according to some embodiments.

FIG. 9 is a block diagram of example walk registers 900, according to some embodiments. In various embodiments, the system utilizes a subset of walk registers among multiple available registers to execute the walk instruction. The walk instruction iterates a block of instructions for a subset of channels of the SIMD thread using the walk registers. As described in more detail herein, while the system is in the walk/endwalk iteration of a code block, each walk register is a register that has a size corresponding to the current walk size. This enables the system use fewer registers for intermediate variables within a walk instruction, or walk/endwalk code block. In various embodiments, the input registers that provide input data from outside of the walk/endwalk code block are moved into input walk registers. Also, the output walk registers are moved into registers that are used by code outside of the walk/endwalk code block. In some embodiments, all these registers are in the register file.

Shown are registers mR0, mR1, and mR2, where each of registers mR0, mR1, and mR2 has 8×8 walk sizes, and each of registers mR0, mR1, and mR2 are divided into four, smaller 4×4 walk sizes.

As indicated above, an mR register has a size corresponding to the current walk size. The wmR register has a size specified in an instruction of the SIMD thread and may correspond to any outer walk, which involves the walking of registers of larger sizes (e.g., 8×8, 16×16, etc.). Also, the required portion of the wmR is extracted (based on the current walk iteration) for use in the instruction.

In various embodiments, register mR0 is the same as register wmR0, and register mR4 is the same as register wmR4. In other words, registers wmR0, wmR1, and wmR2 are the same as physical registers mR0, mR1 and mR2, respectively, with their logical labels changed based on the instructions. The "w" denotes that the instruction increments the register position/walk index. Using walk registers, the system takes the appropriate portion of the input registers within WALK-ENDWALK, and assigns those register portions to the appropriate locations in the output registers.

Referring to both FIGS. 8 and 9, the system initiates walk instruction 802, which includes a walk size of 8×8. During the walk operation, the system iterates a portion of the SIMD instruction, having a walk size of 8×8.

The software instructions zero out register mR2 and then load 8×8 data from an input buffer IB[0] to a register mR0. In parallel, the software instructions load 8×8 data from an input buffer IB[1] to a register mR1. In this example embodiment, register mR0 is associated with one 8×8 SIMD thread, and register mR1 is associated with a second 8×8 SIMD thread.

In this example embodiment, if register mR0 is not=mR1, nested or child walk instruction 812 is executed. As shown, child walk instruction 812 has a walk size of 4×4.

In this example embodiment, because the second level of walk instruction is inside the IF instruction, all of the channel may not be valid (or enabled). The system creates a walk mask by ANDing a dispatch mask and a flow control (FC) mask. In some embodiments, the system may create the dispatch mask at every increment of outermost walk instruction equal to the walk size. Inner or child walk instruction 812 is work that is performed in mask mode. This means that if all of the walk mask corresponding to the next walk increment is zero, the block having no associated enabled channels is skipped and incremented to the next valid block having associated enabled channels.

Child walk instruction 812 adds data from registers wmR0 and to register wmR1 to be added to register wmR2. After adding the appropriate data from registers wmR0 and wmR1, child walk instruction 812 ends the walk based on ENDWALK instruction 814, ends the IF instruction, ends the outer walk based on ENDWALK instruction 804, and then stores the sum in register mR2.

Iterating Group Sum of Multiply Accumulate Operations

Neural networks are made up of a series of layers where each layer has multiple inputs and multiple outputs. Each input and output is a two-dimensional feature map. Each input is connected to and contributes to each output in weighted fashion.

Figure 10A:
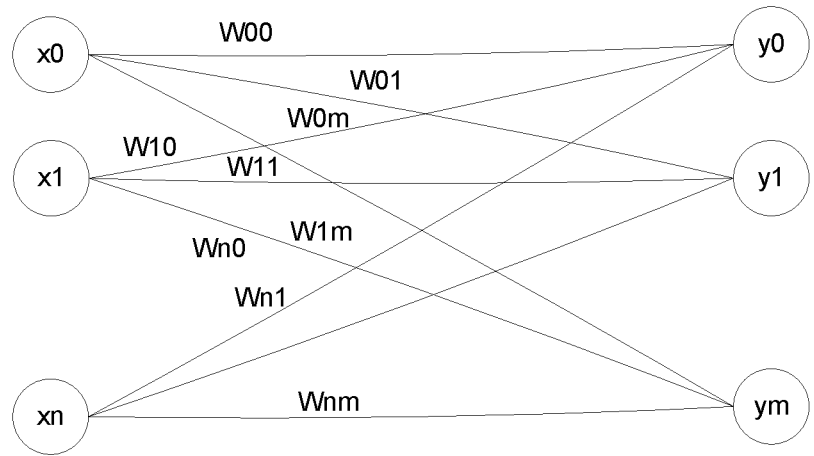
FIG. 10A shows two layers of a neural network wherein each input is connected to and contributes to each output in a weighted process, according to an embodiment.

FIG. 10A shows two layers of a neural network wherein each input is connected to and contributes to each output in a weighted process, according to an embodiment. For an embodiment, the neural network processing includes a compute pipeline having operations which are fundamentally a multiply-accumulate (MAC). A MAC involves multiplying two source operands and accumulating the result into the destination operand.

Figure 10B:
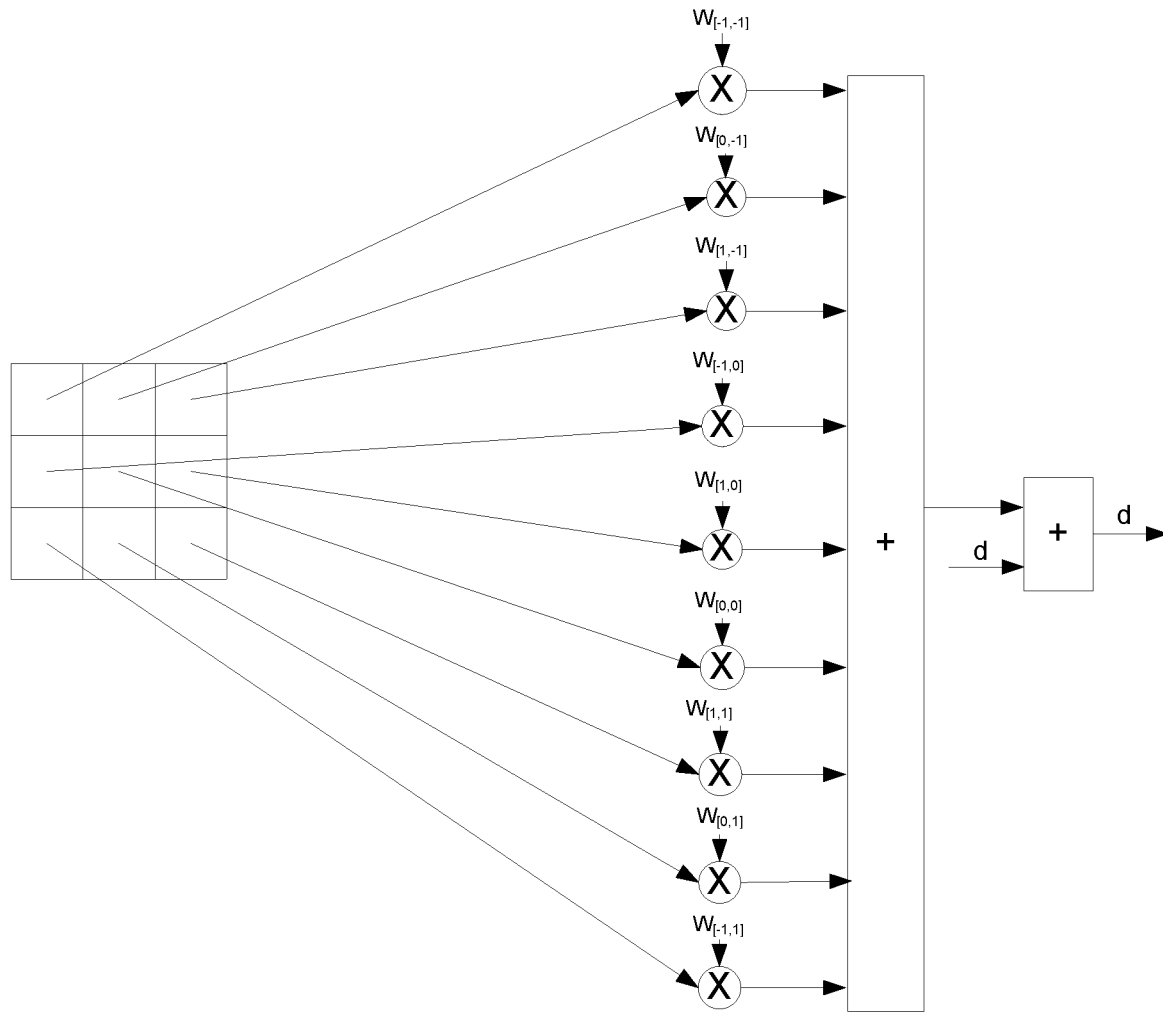
FIG. 10B shows such a MAC operation, according to an embodiment.

FIG. 10B shows such a 3×3 DP (dot product) operation. That is, for example;

$$DP\ 3\times3\ d, s0, s1, s2 // d = \sum_{i=0}^{i=2} \sum_{j=0}^{j=2} (s0[i][j] * s1[i][j]) + d$$

Figure 11A:
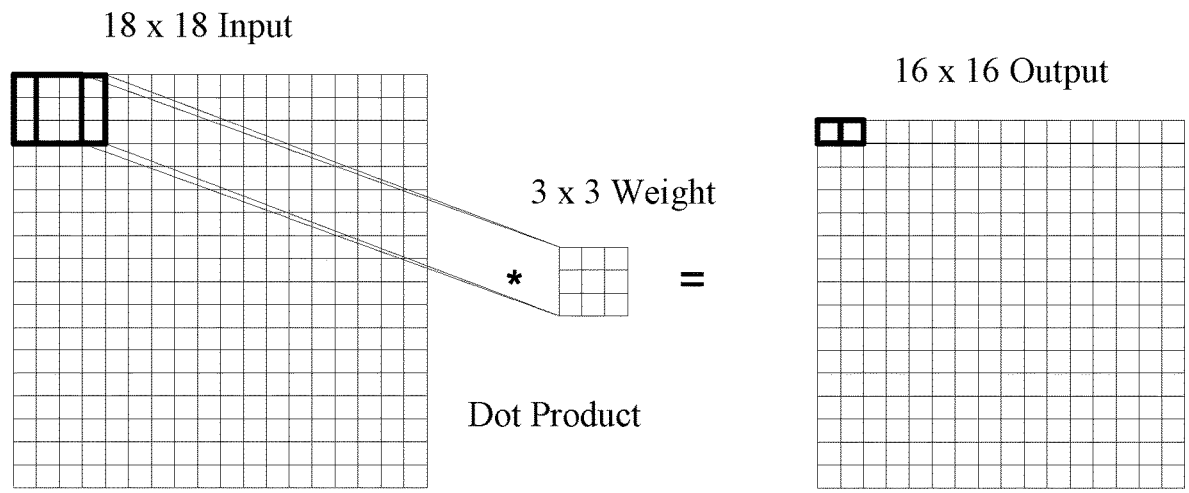
FIG. 11A shows an 18×18 input being convolved with a 3×3 weight to generate a 16×16 output, according to an embodiment.

FIG. 11A shows the DP between an 18×18 input and a 3×3 weight to generate a 16×16 output, according to an embodiment. The DP is performed between the 3×3 blocks of 16×16 in the 18×18 input and the 3×3 weight to generate the 16×16 output.

for (m=0; m<16; m++)
  for (n=0; n<16; n++)

$$d[m][n] = \sum_{i=0}^{i=2} \sum_{j=0}^{j=2} (s0[m+i][n+j] * s1[i][j]) + d[m][n]$$

Figure 11B:
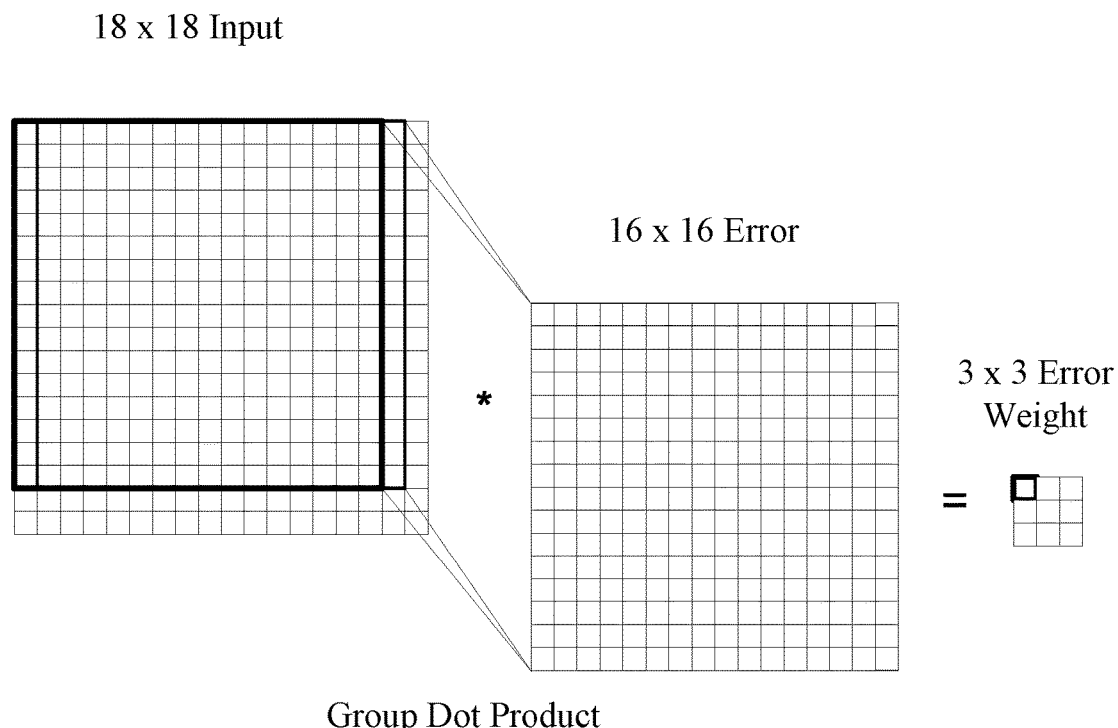
FIG. 11B shows an 16×16 error being convolved with a 18×18 weight to generate a 3×3 error weight, according to an embodiment.

FIG. 11B shows the GDP between an 18×18 input and a 16×16 error to generate a 3×3 error weight, according to an embodiment. The GDP is performed between the 3×3 blocks of 16×16 in the 18×18 input and the 16×16 error to generate the 3×3 weight error.

for (i=0; i<3; i++)
  for (j=0; j<3; j++)

$$d[i][j] = \sum_{m=0}^{m=15} \sum_{n=0}^{n=15} (s0[i+m][j+n] * s1[m][n]) + d[i][j]$$

FIG. 12A shows a CONV (convolution) of the 16×16×4 input with the 1×1×4 weight which generates a 16×16 output, according to an embodiment. During back-propagation, a 16×16 output error, which is the difference between this generated output and the expected output, is created.

for (m=0; m<16; m++)
  for (n=0; n<16; n++)

$$d[m][n] = \sum_{i=0}^{i=4} (s0[i][m][n] * s1[i]) + d[m][n]$$

FIG. 12B shows the 16×16 input is GCONV' ed (group convolved) with the 16×16×4 error to generate the 1×1×4 error weight, according to an embodiment.

for (i=0; i<4; i++)

$$d[i] = \sum_{m=0}^{m=15} \sum_{n=0}^{n=15} (s0[i][m][n] * s1[m][n]) + d[i]$$

Figure 13:
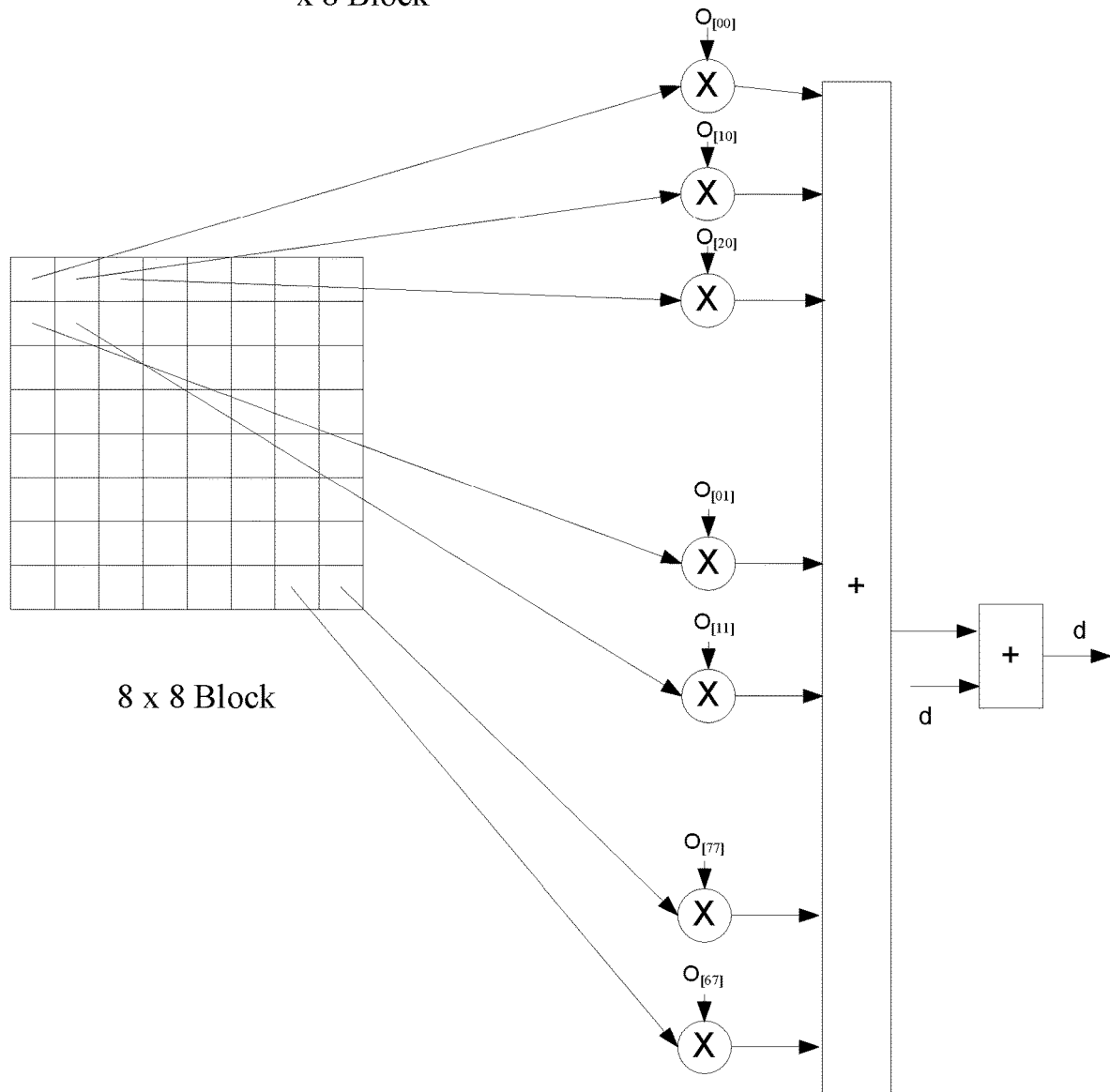
FIG. 13 shows a GDP (Group Dot Product) accumulator, according to an embodiment.

FIG. 13 shows a GDP (Group Dot Product) accumulator, according to an embodiment. A single output is generated by performing the GDP between a block of 8×8 and another 8×8 block.

$$d = \sum_{m=0}^{m=7} \sum_{n=0}^{n=7} (s0[m][n] * s1[m][n]) + d$$

Figure 14:
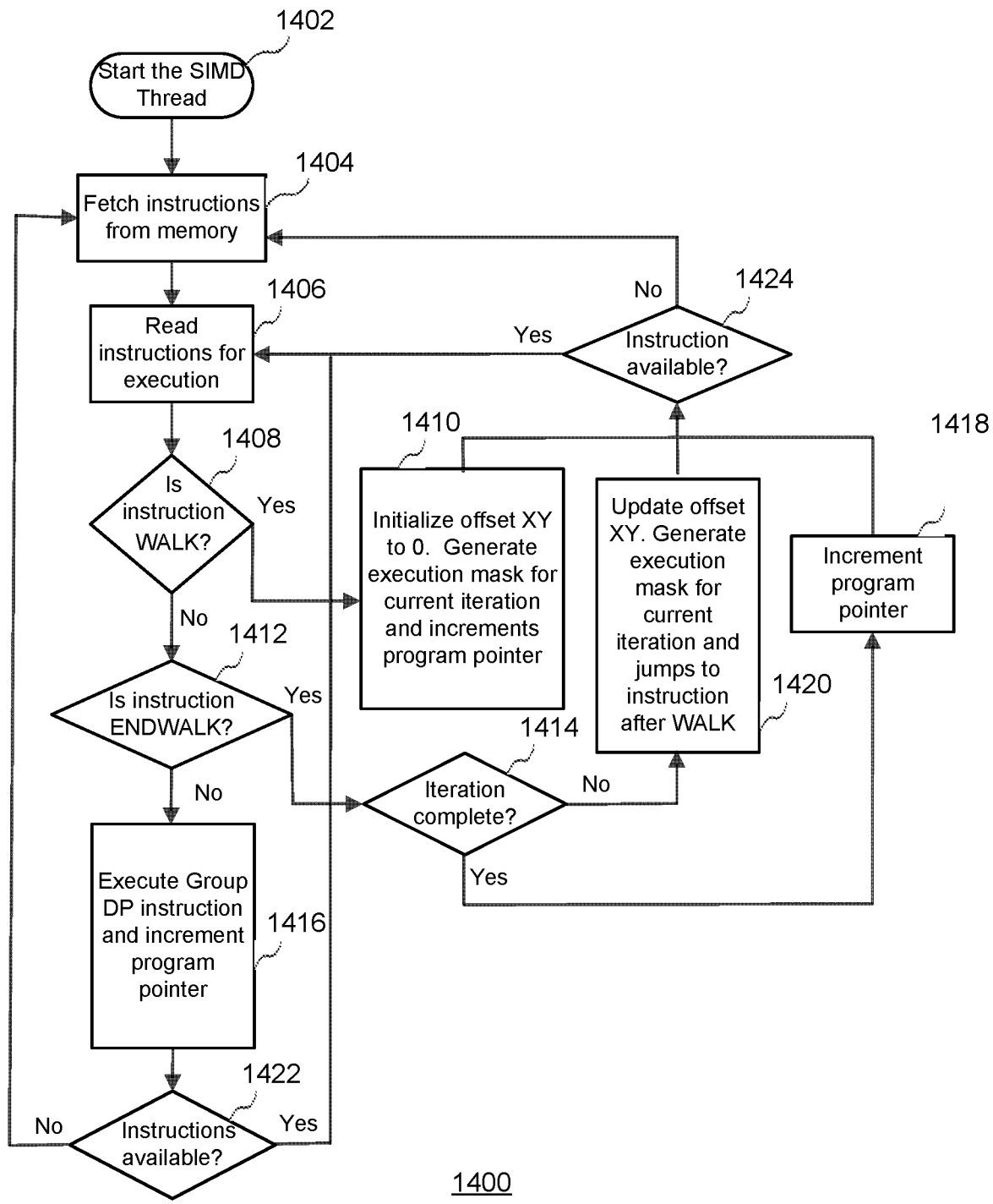
FIG. 14 is another example flow diagram for performing walk operations of SIMD instructions, according to some embodiments.

FIG. 14 is another example flow diagram for performing walk operations of SIMD instructions, according to some embodiments. This embodiment is similar to the embodiment of FIG. 6. Referring to both FIGS. 1 and 14, a method is initiated at block 1402, where thread scheduler 104 of system initiates or starts a SIMD tread. At block 1404, one or more processors of the system fetch instructions for the SIMD thread from a memory such as memory 102 of FIG. 1. Memory 102 may be RAM memory.

At block 1406, a thread arbiter of the system (e.g., system processors) reads the instructions for execution. At block 1408, the thread arbiter of the system determines from the read instructions if any of the instructions are instructions for a WALK (e.g., walk instructions). If yes at block 1408, the thread arbiter provides the walk instruction to a code block iterator, and the flow continues to block 1410. If no at block 1408, the flow continues to block 1412.

At block 1410, the system initializes an offset XY to 0. For an embodiment, the offset XY is the offset from the top-left coordinate of the input block which is mapped to the first source operand in the GSOMAC operations. Since for an embodiment the largest processing size is 8×8 and the input block of size M×N which could be larger than an 8×8, WALK-ENDWALK is used around the code block which includes the GSOMAC operation. At block 1410 the system further generates an execution mask for the current iteration. The system also increments a program pointer. As described herein, in various embodiments, the system determines a walk size based on the walk instruction. In various embodiments, each walk instruction includes a walk size. The system then generates a walk mask of the SIMD thread based on the walk size and an execution mask.

At block 1412, the system determines if any of the instructions are instructions for an ENDWALK. If yes at block 1412, the flow continues to block 1414. If no at block 1412, the flow continues to block 1416.

At block 1414, the system determines if the iteration is complete. If yes at block 1414, the flow continues to block 1418, where the system increments the program pointer. If no at block 1414, the flow continues to block 1420, where the system generates an execution mask for the current iteration and jumps to the instruction after the walk instruction. If no at block 614, the flow continues to block 1420, where the system updates the offset XY. That is, completion of each iteration of the code block within WALK-END-WALK updates the offset XY. For an embodiment, this causes the next 8×8 in the input block to be used as the source operand. Further, an execution mask for the current iteration is generated and jumps to the instruction after the walk instruction. At block 1416, the system executes a group DP (dot product) instruction. That is, the Group SOMAC operation generates the weight error by performing the GDP or GCONV on the input block which is mapped to the first source operand and the output error which is mapped to the second source operand. Further, the program pointer is incremented.

At block 1422, the system determines if any more instructions are available. If no, the flow continues to block 1404, where the system fetches more instructions from memory. If yes, the flow continues to block 1406, where the system reads a next set of instructions for execution.

After completion of any of blocks 1410, 1418, and 1420, the flow continues to block 1424. At block 1424, the system determines if any more instructions are available to be executed in the current set of instructions. If no, the flow continues to block 1404, where the system fetches more instructions from memory. If yes, the flow continues to block 1406, where the system reads instructions for execution.

Figure 15:
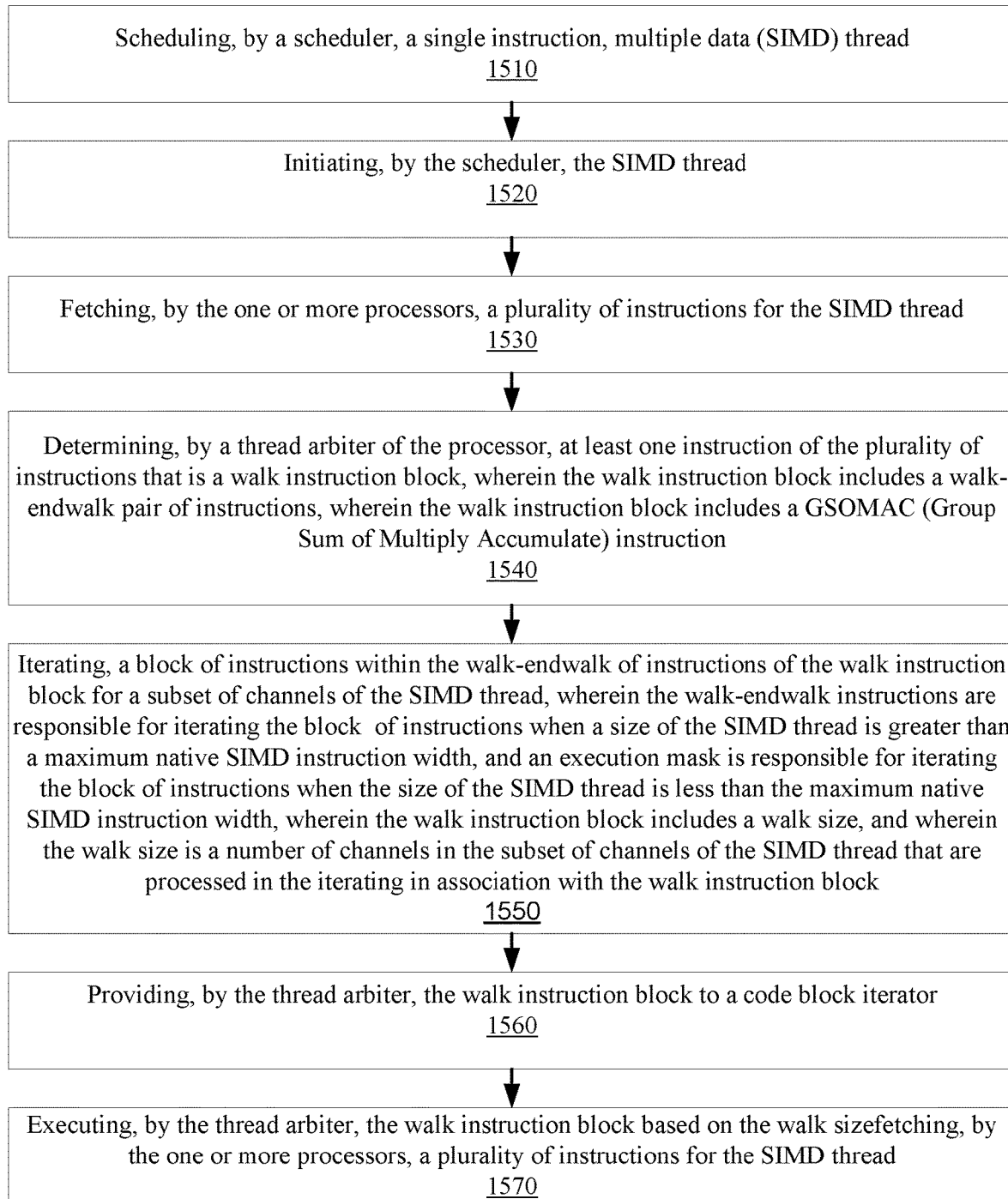
FIG. 15 is a flow chart that includes steps of iterating group dot product operations, according to an embodiment.

FIG. 15 is a flow chart that includes steps of iterating group dot product operations, according to an embodiment. A first step 1510 includes scheduling, by a scheduler, a single instruction, multiple data (SIMD) thread. A second step 1520 includes initiating, by the scheduler, the SIMD thread. A third step 1530 includes fetching, by the one or more processors, a plurality of instructions for the SIMD thread from a memory. A fourth step 1540 includes determining, by a thread arbiter of the processor, at least one instruction of the plurality of instructions that is a walk instruction block, wherein the walk instruction block includes a walk-endwalk pair of instructions, wherein the walk instruction block includes a GSOMAC (Group Sum of Multiply Accumulate) instruction. A fifth step 1550 includes iterating, a block of instructions within the walk-endwalk of instructions of the walk instruction block for a subset of channels of the SIMD thread, wherein the walk-endwalk instructions are responsible for iterating the block of instructions when a size of the SIMD thread is greater than a maximum native SIMD instruction width, and an execution mask is responsible for iterating the block of instructions when the size of the SIMD thread is less than the maximum native SIMD instruction width, wherein the walk instruction block includes a walk size, and wherein the walk size is a number of channels in the subset of channels of the SIMD thread that are processed in the iterating in association with the walk instruction block. A sixth step 1560 includes providing, by the thread arbiter, the walk instruction block to a code block iterator. A seventh step 157 includes executing, by the thread arbiter, the walk instruction block based on the walk size.

For an embodiment, the GSOMAC instruction includes a GDP (Group Dot Product) operative to convolve an entire M×N block against an (M+a)×(N+b) block to generate an a×b output. For an embodiment, the a×b output is generated for weight error generation in back-propagation. For an embodiment, M=N.

For an embodiment, the GSOMAC instruction includes a GCONV (Group Convolve) operative to convolve an entire M×N block against an M×N×P block to generate a 1×P output.

Figure 16:
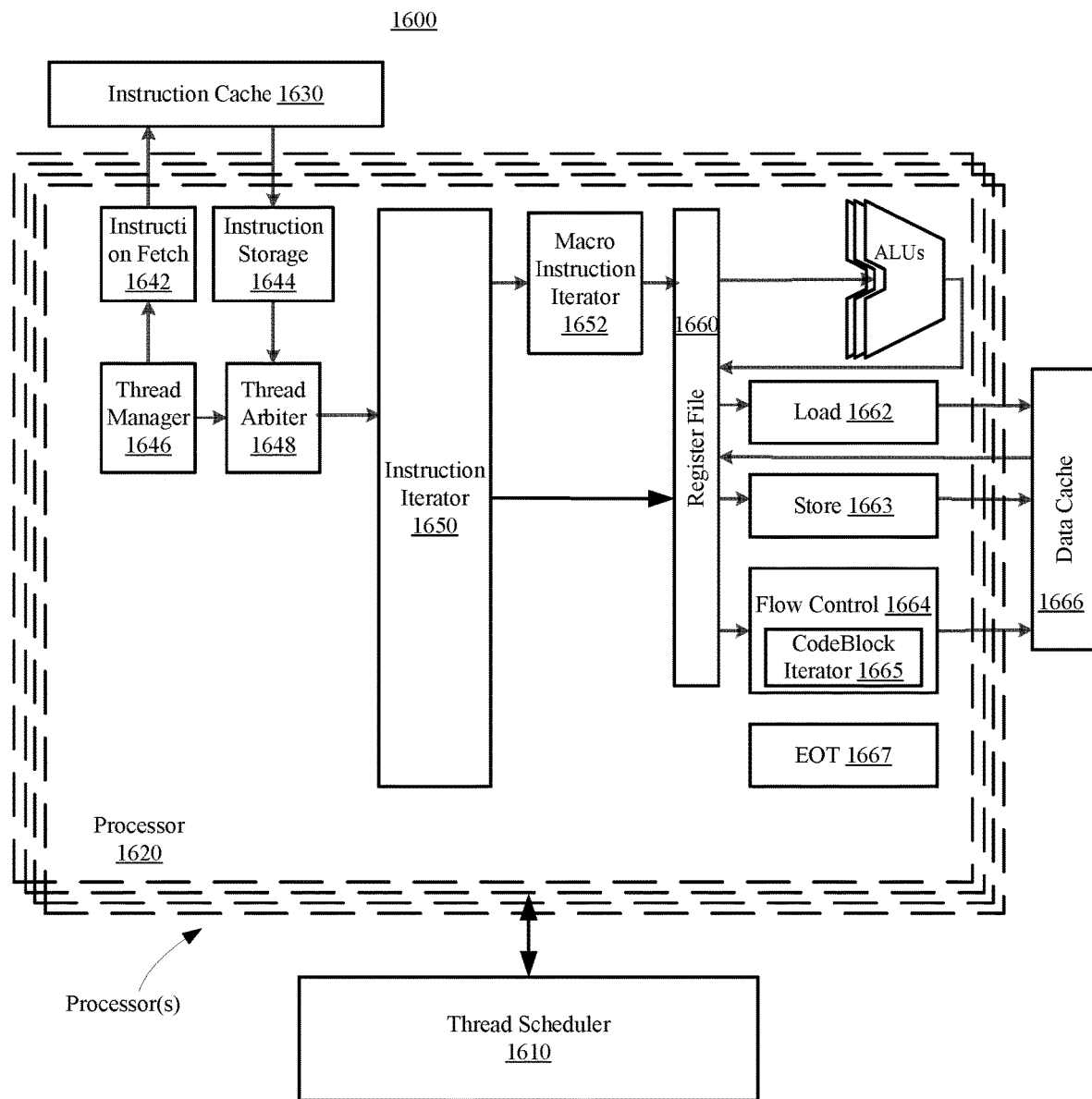
FIG. 16 shows a GSP (Graph Streaming processor), according to an embodiment.

FIG. 16 shows a GSP (Graph Streaming processor) 1600, according to an embodiment. For an embodiment, the GSP 1600 includes a plurality of processors including a processor 1620. Further, the GSP 1600 further includes a thread scheduler 1610, instruction cache 1630, and data cache

1666. For at least some embodiments, each of the processors (including processor 1620) operates to process a plurality of threads.

For an embodiment, the thread scheduler 1610 includes a module that includes a series of identical stages each of which checks on the availability of resources for running a thread (for example, a thread slot, or registers) across an array of processors and dispatches the thread. For at least some embodiments, execution (processing) of an acyclic graph with multiple nodes is carried out by depth-wise mapping of the nodes to the stages. The commands to schedule threads are held in command buffers which are written into by a stage and read from by the next stage, wherein the command buffers are located between the stages.

For an embodiment, the instruction cache 1630 includes a read-only cache for servicing the instruction cache-line fetch requests from the threads running on the plurality of processors.

For an embodiment, the data cache includes a read-write cache for servicing the data fetch and write-back requests from the threads running (being processed) on the plurality of processors. Further, at least some embodiments further include a device memory where operating software places all the buffers that are required for execution of the previously mentioned acyclic graph. For an embodiment, these buffers include the command buffers and data buffers.

For at least some embodiments, the processor 1620 includes a thread manager 1646, an instruction fetch 1642, instruction storage 1644, and a thread arbiter 1648.

For an embodiment, the thread manager 1646 includes a module that holds all the states associated with each thread. This includes the initial information at thread dispatch and the state generated during execution of the thread.

For an embodiment, the instruction fetch 1642 includes a module that initiates the fetch of a cache-line (for example, 64 Bytes) of instructions from memory via the instruction cache 1630.

For an embodiment, the instruction storage 1644. For an embodiment, each thread includes 2 cache-line slots that enables the fetch of a second cache-line when a first cache-line is returned by the instruction cache. Thus, the execution of one cache-line worth of instructions overlaps with the fetch of the second cache-line of instructions. For an embodiment, the instruction cache is the instruction cache 1630.

For an embodiment, the thread arbiter 1648 manages scheduling of instructions into pipelines. For an embodiment, the availability of instructions and the absence of any dependency on prior instructions pending completion of execution make a thread a candidate for scheduling instructions into the different execution pipelines. For an embodiment, the thread arbiter 1648 is responsible for fair scheduling of instructions into each of these pipelines.

The processor further includes an instruction iterator 1650, and a macro instruction iterator 1652. For an embodiment, the instruction iterator 1650 includes a module that is responsible for sub-cycling each SIMD instruction for as many phases (iterations) as are required to complete the processing of the instruction. For an embodiment, multiple phases (iterations) are required because of a narrower register file and/or a narrower execution pipeline than an instruction SIMD (single instruction, multiple data) width. That is, data read out of a register file and/or the width of the execution pipeline is less than the instruction SIMD width.

For an embodiment, the macro instruction iterator 1652 includes a module that is responsible for handling the SOMAC instructions with an instruction size. The macro instruction iterator 1652 controls sequencing of a first source operand read and zero-detection of terms of the first source operand, the second source operand read and zero detection of terms of the second source operand, and the destination operand read and update.

The processor 1620 further includes a register file 1652. For an embodiment, the register file 1652 includes a storage module, and the source and destination operands for each instruction are resident in this storage module. For an embodiment, all operations carried out by the processor 1620 reside on registers in the register file. For an embodiment, data can be loaded from memory into the register file and data can be stored to memory from the register file.

For at least some embodiments, the processor 1620 includes a plurality of pipelines. For an embodiment, the plurality of processors holds a number of pipelines for performing the various operations needed in the execution of code. These include the math computes, accesses from and to memory, conditional operations and thread termination. There are also multiple instances of these modules based on the throughput requirements for each of the operations.

For at least some embodiments, the pipeline processing includes an ALU (arithmetic logic unit) pipeline, a load pipeline, a store pipeline, a flow control pipeline, and an EOT (end of thread) pipeline.

A plurality of ALUs 1661 enables operation of the ALU pipeline. For an embodiment, the ALUs 1661 operate to perform math operations including add/subtract/multiply/divide, compares, bit-wise logical operations and data movement.

A load module 1662 enables the load pipeline. For an embodiment, the load module 1662 performs the issuance of data fetches from memory.

A store module 1663 enables the store pipeline. For an embodiment, the store module 1663 is used for sending the results in the register file to memory.

A flow control module 1664 enables the flow control pipeline. For an embodiment, the flow control module 1664 handles all conditional statements including IF/ELSE/ENDIF, WHILE, ENDLOOP, BREAK, and/or CONTINUE.

A code block iterator 1665 of the flow control module 1664 services WALK/ENDWALK instructions.

An EOT module 1667 enables the EOT pipeline. For an embodiment, the EOT module 1667 handles a thread termination command and releases all resources occupied by the thread in the processor 1620.

Figure 17A:
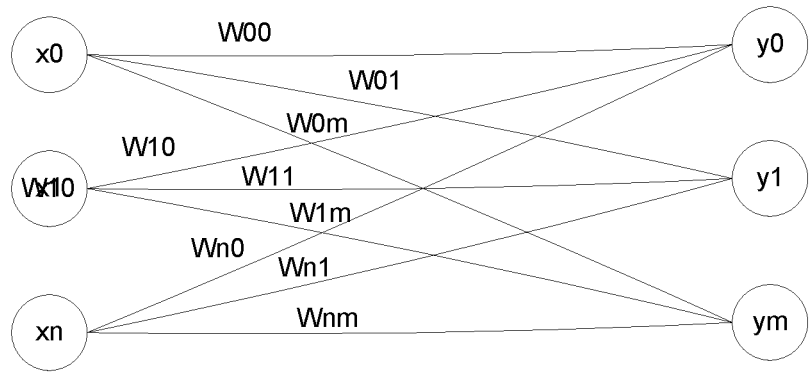
FIG. 17A shows two layers of a neural network wherein each input is connected to and contributes to each output in a weighted process, according to an embodiment.

At least some embodiments of neural networks are made up of a series of layers where each layer has multiple inputs and multiple outputs. Each input and output is a two-dimensional feature map. Each input is connected to and contributes to each output in weighted fashion. FIG. 17A shows two layers of a neural network wherein each input is connected to and contributes to each output in a weighted process, according to an embodiment.

For an the neural network processing includes a compute pipeline having operations which are fundamentally a multiply-accumulate (MAC). A MAC involves multiplying two source operands and accumulating the result into the destination operand.

Figure 17B:
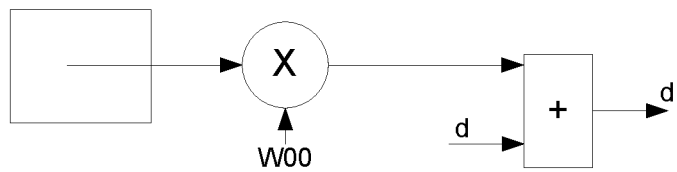
FIG. 17B shows such a MAC operation, according to an embodiment.

FIG. 17B shows such a MAC operation. That is, for example;

$$MAC\ d,s0,s1//d=s0*s1+d$$

Figure 17C:
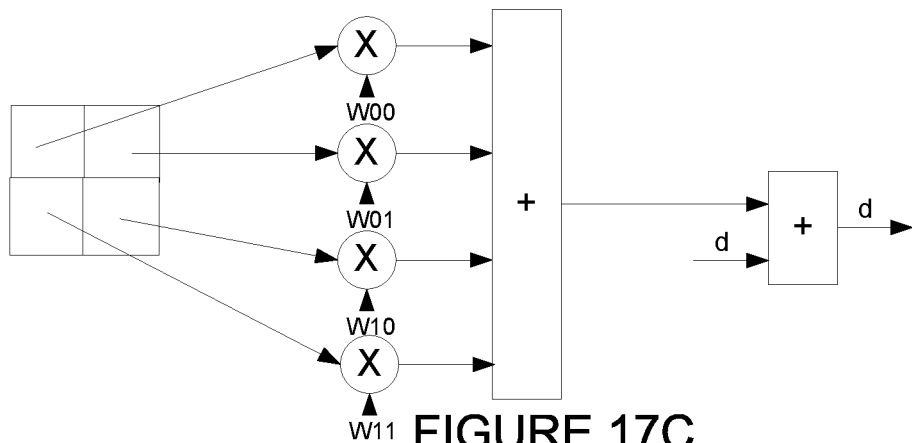
FIG. 17C shows a dot-product-accumulate, according to an embodiment.

FIG. 17C shows an example of a dot-product-accumulate operation which can be referred to as a Sum-Of-Multiply-Accumulate (SOMAC).

Figure 17D:
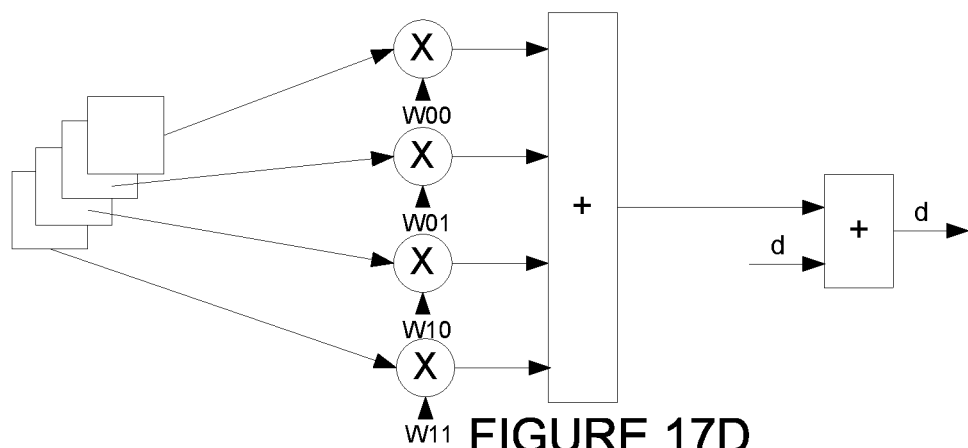
FIG. 17D shows an example of a convolve-accumulate operation, according to an embodiment.

FIG. 17D shows an example of a convolve multiple and accumulate operation which can also be referred to as a Sum-Of-Multiply-Accumulate (SOMAC).

For SOMAC operations, when either s0 or s1 are zero, the compute result is 0 which when accumulated into the destination leaves the destination unchanged. Hence, the operation can be pruned or eliminated.

In neural networks, each of the outputs is generated by performing dot-product-accumulate or convolve-accumulate operations on each of the inputs (s0) against weights (s1). Given the widespread use of these operations, pruning them provides significant benefits.

Figure 18:
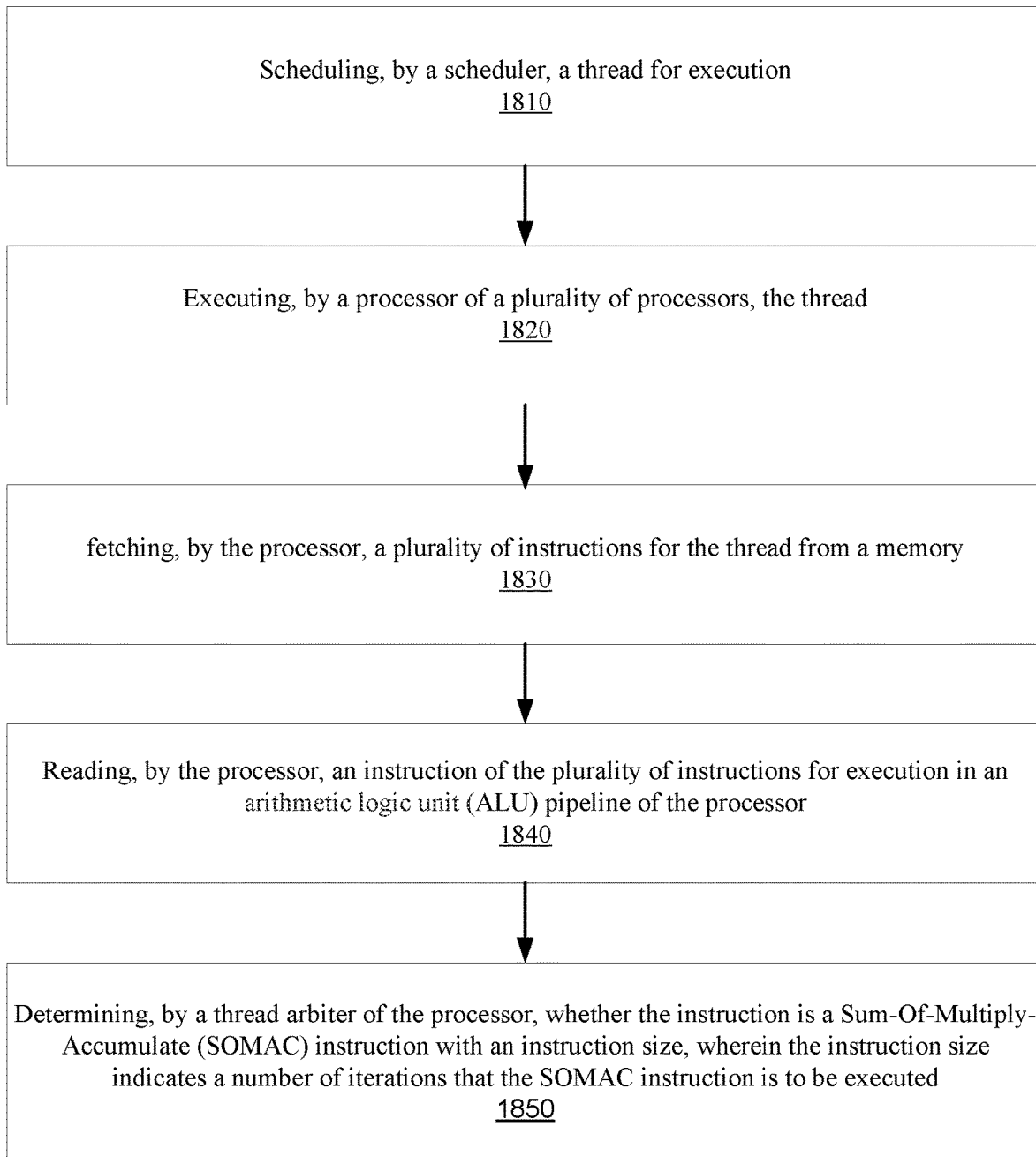
FIG. 18 is a flow chart that includes steps of a method of reducing operations of Sum-Of-Multiply-Accumulate (SO-MAC) instructions, according to an embodiment.

FIG. 18 is a flow chart that includes steps of a method of reducing operations of Sum-Of-Multiply-Accumulate (SOMAC or GSOMAC) instructions, according to an embodiment. A first step 1810 includes scheduling, by a scheduler, a thread for execution. A second step 1820 includes executing, by a processor of a plurality of processors, the thread. A third step 1830 includes fetching, by the processor, a plurality of instructions for the thread from a memory. A fourth step 1840 includes selecting, by a thread arbiter of the processor, an instruction of the plurality of instructions for execution in an arithmetic logic unit (ALU) pipeline of the processor, and reading the instruction. A fifth step 1850 includes determining, by a macro-instruction iterator of the processor, whether the instruction is a Sum-Of-Multiply-Accumulate (SOMAC) instruction with an instruction size, wherein the instruction size indicates a number of iterations that the SOMAC instruction is to be executed.

For at least some embodiment, a thread is an instance of a program that is run on a processor. For an embodiment, a thread includes a set of instructions operating on input data and producing output data. The input and output data can be stored within the data cache 166.

As previously described, for an embodiment, a GSP includes a plurality of processors that processes a plurality of threads.

A one of the plurality of processors fetches a plurality of instructions for the thread from a memory. For an embodiment, the memory includes the instruction cache 130.

Further, the processor reads an instruction of the plurality of instructions for execution in an arithmetic logic unit (ALU) pipeline of the processor. The ALU pipeline is operable on one or more of the ALUs 1561.

A macro-instruction iterator of the processor determines whether the instruction is a Sum-Of-Multiply-Accumulate (SOMAC) instruction with an instruction size, wherein the instruction size indicates a number of iterations that the SOMAC instruction is to be executed. If the instruction is a Sum-Of-Multiply-Accumulate (SOMAC) instruction, then there may be opportunities to reduce the number of operations of the SOMAC instruction by evaluating terms of operands of the SOMAC instruction.

For an embodiment, the compute pipeline includes operations which are fundamentally a multiply-accumulate (MAC). A MAC involves multiplying two source operands and accumulating the result into the destination operand. For example, a MAC that includes two operands A, B, and a destination operand can be represented as:

$$C = A*B + C - \text{(Multiply-Accumulate MAC)};$$

For at least some embodiments, variations of the MAC operations are used extensively in neural networks, such as, Sum-Of-Multiply-Accumulate (SOMAC) instructions. These include, for example, a dot-product-accumulate operation and a convolve-accumulate operation. For an embodiment, the two source operands and the destination operand need to be read from the register file and fed into the compute pipeline. The operation is performed and the result accumulated into the destination and written back. Such variations (such as, Sum-Of-Multiply-Accumulate (SOMAC) instructions) can be represented by:

$$C = \Sigma A_i * B_i + C - \text{(Sum-Of-Multiply-Accumulate SOMAC)},$$

Multiple iterations of this operation, as determined by the instruction size, can be further represented by a loop as:
For (j=0; j<instruction size; j++)

$$C[j] = \Sigma A_i * B_i[j] + C[j] \text{(SOMAC in a loop)},$$

wherein the first source operand ($A_i$) is common or shared for all iterations.

At least some of the described embodiments reduce the number of operations performed in the execution of the SOMAC instructions. For a SOMAC instruction, the instruction size refers to the number of iterations the SOMAC needs to run for and corresponds to the loop count to generate all the results of the SOMAC operations.

For an embodiment, the processor reads a first source operand of a plurality of source operands of the SOMAC instruction from a register file, wherein the first source operand includes one or more terms and is the input to the SOMAC operation. For an embodiment, each source operand of the plurality of source operands is a register from a corresponding register file that is an input to the instruction. Further, a macro-instruction iterator of the processor determines if all terms of the first source operand are zero. It is to be understood that each operand can be made up of multiple terms, such as, a dot-product-accumulate (DPAC) and convolve-accumulate (CONVAC). Standard MAC operation only includes one term.

For an embodiment, execution of the SOMAC instruction is skipped and a next instruction is read for execution when all terms of the first source operand are zero. For example, in the equations provided above, when all the terms of the operand $A_i$ are zero, then execution of all iterations of the instruction are skipped.

An embodiment includes the thread arbiter of the processor selecting a second instruction of the plurality of instructions for execution in an arithmetic logic unit (ALU) pipeline of the processor, and reading the second instruction, if the first instruction is skipped in an ALU pipeline of the processor. Further the macro-instruction iterator of the processor determines whether the second instruction is a Sum-Of-Multiply-Accumulate (SOMAC) instruction with an instruction size, wherein the instruction size indicates a number of iterations that the SOMAC instruction is to be executed.

For an embodiment, if the instruction is not skipped, the processor reads a second source operand of the plurality of source operands of the SOMAC instruction from the register file when all terms of the first source operand are not zero, wherein the second source operand includes a number of sets of one or more terms, wherein the number of sets is the instruction size. Further, the macro-instruction iterator of the processor determines an instruction mask, wherein the instruction mask includes a plurality of bits, and each bit is determined based on which sets of the number of sets of the second operand have all terms of the set being zero.

For at least some embodiments, each bit of the plurality of bits corresponding to a set of the plurality of sets of the second source operand having all terms of zero are reset (reset to zero), and each bit of the plurality of bits corresponding to a set of the plurality of sets of the second source operand having at least one term non-zero are set (set to one).

For at least some embodiments, the processor executes multiply and accumulate operations of the SOMAC operation for the iterations which are not disabled (mask bit is set) and skips the iterations which are disabled (mask bit is reset) based on the instruction mask.

For at least some embodiments, the processor reads a destination operand of the plurality of operands of the SOMAC instruction, adds a sum-of-multiply result to the destination operands, and writes the multiply-accumulate result back to the destination operand, wherein the destination operand is a register from the register file that is an output of the instruction. The destination operand is read and updated for each iteration, wherein there is a separate destination operand for each iteration. It is to be understood that, for at least some embodiments, these operations are only performed for the iterations which are not disabled (mask bit is set).

For at least some embodiments, the instruction is one of a plurality of Sum-Of-Multiply-Accumulate (SOMAC) instructions of an implementation of a neural network. For at least some embodiments, each of the plurality of SOMAC instructions includes at least one of a multiply-accumulate operation, a dot product-accumulate operation, or a convolve-accumulate operation. It is to be understood that some other embodiments include other types of SOMAC instructions.

FIG. 19 shows operation of a SOMAC instruction with 4 terms (for example, a dot product-accumulate operation with 4 terms), wherein the instruction size of the SOMAC instruction is 8, and wherein the instruction size sets the number of iterations performed by the SOMAC instruction, according to an embodiment. Here, owing to the instruction size of the SOMAC being 8, 8 iterations are to be performed to complete the SOMAC instruction.

As previously described, the macro-instruction iterator of the processor determines whether the instruction is a Sum-Of-Multiply-Accumulate (SOMAC) instruction with an instruction size, wherein the instruction size indicates a number of iterations that the SOMAC instruction is to be executed.

As shown, the first operand (operand1) is multiplied by the 8 different iterations of the second operand (operand2). First, a determination is made whether all of the terms of the first operand are zero. If all of the terms of the first operand are zero, then the entire operation of the current SOMAC instruction can be skipped.

As previously described, the processor reads a first source operand of a plurality of source operands of the SOMAC instruction from a register file, wherein the first source operand includes one or more terms, wherein each source operand of the plurality of source operands is a register from a corresponding register file that is an input to the instruction. Further, a macro-instruction iterator of the processor determines if all terms of the first source operand are zero. In this example, not all the terms of the first source operand are zero.

If all of the terms of the first operand are not zero, then a determination is made on each of the sets of the second source operand. As shown in the figure, only the terms of the fourth and sixth sets are zero, and therefore, the corresponding iterations are skipped.

Figure 20:
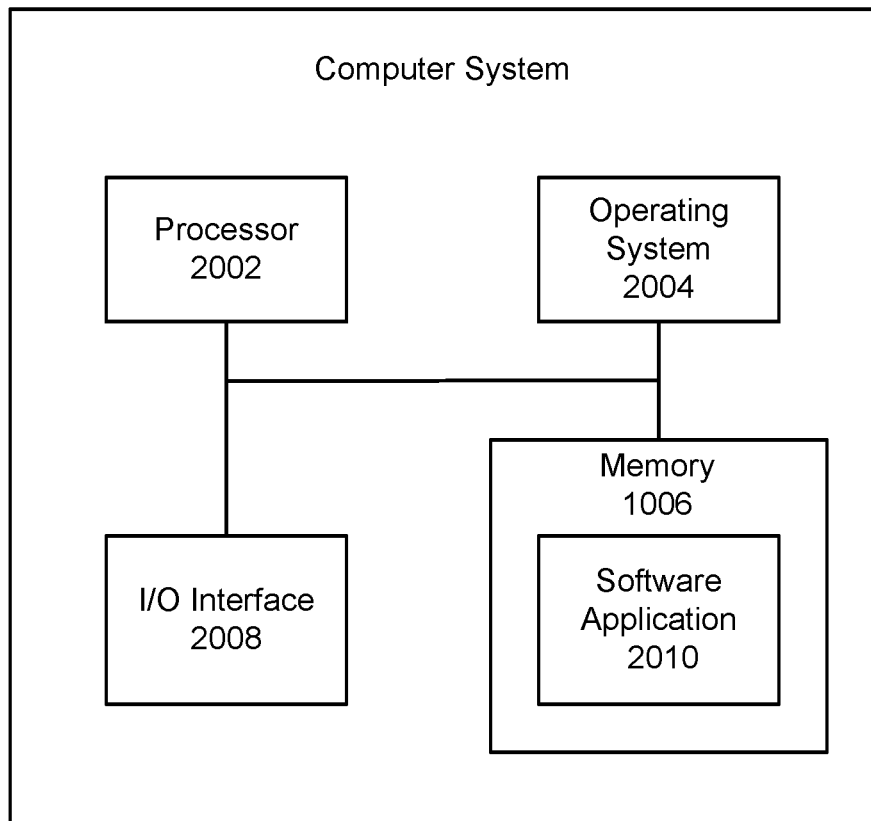
FIG. 20 is a block diagram of an example computer system, which may be used for embodiments described herein.

FIG. 20 is a block diagram of an example computer system 2000, which may be used for embodiments described herein. For example, computer system 2000 may be used to implement graph streaming processor 100 of FIG. 1, as well as to perform embodiments described herein. In some implementations, computer system 2000 may include a processor 2002, an operating system 2004, a memory 2006, and an input/output (I/O) interface 2008. In various implementations, processor 2002 may be used to implement various functions and features described herein, as well as to perform the method implementations described herein. While processor 2002 is described as performing implementations described herein, any suitable component or combination of components of computer system 2000 or any suitable processor or processors associated with computer system 2000 or any suitable system may perform the steps described. Implementations described herein may be carried out on a user device, on a server, or a combination of both.

Computer system 2000 also includes a software application 2010, which may be stored on memory 2006 or on any other suitable storage location or computer-readable medium. Software application 2010 provides instructions that enable processor 2002 to perform the implementations described herein and other functions. Software application may also include an engine such as a network engine for performing various functions associated with one or more networks and network communications. The components of computer system 2000 may be implemented by one or more processors or any combination of hardware devices, as well as any combination of hardware, software, firmware, etc.

For ease of illustration, FIG. 20 shows one block for each of processor 2002, operating system 2004, memory 2006, I/O interface 2008, and software application 2010. These blocks 2002, 2004, 2006, 2008, and 2010 may represent multiple processors, operating systems, memories, I/O interfaces, and software applications. In various implementations, computer system 2000 may not have all of the components shown and/or may have other elements including other types of components instead of, or in addition to, those shown herein.

Although specific embodiments have been described and illustrated, the described embodiments are not to be limited to the specific forms or arrangements of parts so described and illustrated. The embodiments are limited only by the appended claims.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed:
1. A system comprising:
    a scheduler operative to schedule a single instruction, multiple data (SIMD) thread;
    one or more processors operative to execute the SIMD thread; and
    logic encoded in one or more non-transitory computer-readable storage media for execution by the one or more processors and when executed operative to cause the one or more processors to perform operations comprising:
    initiating, by the scheduler, the SIMD thread;
    fetching, by the one or more processors, a plurality of instructions for the SIMD thread from a memory;

determining, by a thread arbiter of the processor, at least one instruction of the plurality of instructions that is a walk instruction block, wherein the walk instruction block includes a walk-endwalk pair of instructions, wherein the walk instruction block includes a GSO-MAC (Group Sum of Multiply Accumulate) instruction;

iterating a block of instructions within the walk-endwalk pair of instructions of the walk instruction block for a subset of channels of the SIMD thread, wherein the walk-endwalk instructions are responsible for iterating the block of instructions when a size of the SIMD thread is greater than a maximum native SIMD instruction width, and an execution mask is responsible for iterating the block of instructions when the size of the SIMD thread is less than the maximum native SIMD instruction width, wherein the walk instruction block includes a walk size, and wherein the walk size is a number of channels in the subset of channels of the SIMD thread that are processed in the iterating in association with the walk instruction block;

providing, by the thread arbiter, the walk instruction block to a code block iterator; and executing, by the thread arbiter, the walk instruction block based on the walk size.

2. The system of claim 1, wherein the GSOMAC instruction includes a GDP (Group Dot Product) operative to convolve an entire M×N block against an (M+a)×(N+b) block to generate an a×b output, wherein M, N, a, and b are all positive integers.

3. The system of claim 1, wherein the GSOMAC instruction includes a GCONV (Group Convolve) operative to convolve an entire M×N block against an M×N×P block to generate a 1×P output, wherein M, N, and P are all positive integers.

4. The system of claim 1, wherein the logic when executed is further operable to cause the one or more processors to perform operations comprising:

determining, an instruction size of the GSOMAC instruction, wherein the instruction size indicates a number of iterations that the GSOMAC instruction is to be executed.

5. The system of claim 1, wherein the logic when executed is further operable to cause the one or more processors to perform operations comprising:

reading a first source operand of a plurality of source operands of the GSOMAC instruction from a register file, wherein the first source operand includes one or more terms, wherein each source operand of the plurality of source operands is a register from a corresponding register file that is an input to the instruction; and determining if all terms of the first source operand are zero.

6. The system of claim 5, wherein the logic when executed is further operable to cause the one or more processors to perform operations comprising:

skipping execution of the GSOMAC instruction and reading a next instruction for execution when all terms of the first source operand are zero.

7. The system of claim 5, wherein the logic when executed is further operable to cause the one or more processors to perform operations comprising:

selecting a second instruction of the plurality of instructions for execution in an arithmetic logic unit (ALU) pipeline of the processor, and reading the second instruction; and determining whether the second instruction is a GSO-MAC instruction with an instruction size, wherein the instruction size indicates a number of iterations that the GSOMAC instruction is to be executed.

8. The system of claim 4, wherein the logic when executed is further operable to cause the one or more processors to perform operations comprising:

reading a second source operand of the plurality of source operands of the GSOMAC instruction from the register file when all terms of the first source operand are not zero, wherein the second source operand includes a number of sets of one or more terms, wherein the number of sets is the instruction size;

determining an instruction mask, wherein the instruction mask includes a plurality of bits, and each bit is determined based which sets of the number of sets of the second operand have all terms of the set being zero.

9. The system of claim 8, wherein each bit of the plurality of bits corresponding to a set of the plurality of sets of the second source operand having all terms of zero are reset, and each bit of the plurality of bits corresponding to a set of the plurality of sets of the second source operand having at least one term non-zero are set.

10. The system of claim 9, wherein the logic when executed is further operable to cause the one or more processors to perform operations comprising:

executing multiply and accumulate operations of the GSOMAC operation for the iterations which are not disabled (mask bit is set) and skipping the iterations which are disabled (mask bit is reset) based on the instruction mask.

11. The system of claim 10, wherein the logic when executed is further operable to cause the one or more processors to perform operations comprising:

reading a destination operand of the plurality of operands of the GSOMAC instruction;

adding a sum-of-multiply result to the destination operand;

writing the multiply-accumulate result back to the destination operand, wherein the destination operand is a register from the register file that is an output of the instruction;

wherein the destination operand is read and updated for each iteration, wherein there is a separate destination operand for each iteration.

12. The system of claim 1, wherein the SIMD thread includes a dispatch mask, and wherein the dispatch mask indicates which channels of a plurality of channels are enabled and/or indicates which channels of the plurality of channels are disabled at an initial point in time.

13. The system of claim 1, wherein the walk instruction block involves processing data from the subset of the channels of the plurality of channels during execution of an iteration of a block of instructions for the SIMD thread.

14. The system of claim 1, wherein the logic when executed is further operable to cause the one or more processors to perform operations comprising generating, by the code block iterator, a walk mask of the SIMD thread, wherein the walk mask indicates which subset of channels that are enabled and/or disabled during a particular walk iteration of executing the plurality of instructions for the SIMD thread.

15. The system of claim 1, wherein the logic when executed is further operable to cause the one or more processors to perform operations comprising generating, by the code block iterator, a walk mask of the SIMD thread based at least on the walk size and the execution mask, wherein the execution mask is a mask that is applied when performing the plurality of instructions for the SIMD thread during a particular iteration of executing instructions for the SIMD thread.

16. The system of claim 1, wherein the logic when executed is further operable to cause the one or more processors to perform operations comprising utilizing a subset of walk registers of a plurality of walk registers to execute the walk instruction block.

17. The system of claim 1, wherein the logic when executed is further operable to cause the one or more processors to perform operations comprising:
  initiating the walk instruction block during execution of a first iteration of executing instructions for the SIMD thread;
  ending the walk instruction block;
  initiating a second walk instruction block during execution of a second iteration of executing instructions for the SIMD thread; and
  ending the second walk instruction block.

18. A computer-implemented method comprising:
  initiating, by a scheduler, a single instruction, multiple data (SIMD) thread, wherein the scheduler is operative to schedule the SIMD thread;
  fetching, by the one or more processors, a plurality of instructions for the SIMD thread from a memory;
  determining, by a thread arbiter of the processor, at least one instruction of the plurality of instructions that is a walk instruction block, wherein the walk instruction block includes a walk-endwalk pair of instructions, wherein the walk instruction block includes a GSOMAC (Group Sum of Multiply Accumulate) instruction;
  iterating a block of instructions within the walk-endwalk pair of instructions of the walk instruction block for a subset of channels of the SIMD thread, wherein the walk-endwalk instructions are responsible for iterating the block of instructions when a size of the SIMD thread is greater than a maximum native SIMD instruction width, and an execution mask is responsible for iterating the block of instructions when the size of the SIMD thread is less than the maximum native SIMD instruction width, wherein the walk instruction block includes a walk size, and wherein the walk size is a number of channels in the subset of channels of the SIMD thread that are processed in the iterating in association with the walk instruction block;
  providing, by the thread arbiter, the walk instruction block to a code block iterator; and
  executing, by the thread arbiter, the walk instruction block based on the walk size.

19. The method of claim 18, wherein the GSOMAC instruction includes a GDP (Group Dot Product) operative to convolve an entire M×N block against an (M+a)×(N+b) block to generate an a×b output, wherein M, N, a, and b are all positive integers.

20. The method of claim 18, wherein the GSOMAC instruction includes a GCONV (Group Convolve) operative to convolve an entire M×N block against an M×N×P block to generate a 1×P output, wherein M, N, and P are all positive integers.

* * * * *